(12) United States Patent
Lee et al.

(10) Patent No.: US 11,452,015 B2
(45) Date of Patent: Sep. 20, 2022

(54) METHOD AND APPARATUS FOR TRIGGERING TRANSMISSION CARRIER RESELECTION PROCEDURE FOR DEACTIVATED DUPLICATION IN WIRELESS COMMUNICATION SYSTEM

(71) Applicant: LG ELECTRONICS INC., Seoul (KR)

(72) Inventors: Youngdae Lee, Seoul (KR); Taehun Kim, Seoul (KR); Jongwoo Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 24 days.

(21) Appl. No.: 17/254,838

(22) PCT Filed: Aug. 8, 2019

(86) PCT No.: PCT/KR2019/009953
§ 371 (c)(1),
(2) Date: Dec. 21, 2020

(87) PCT Pub. No.: WO2020/032612
PCT Pub. Date: Feb. 13, 2020

(65) Prior Publication Data
US 2021/0266804 A1     Aug. 26, 2021

(30) Foreign Application Priority Data

Aug. 10, 2018   (KR) .......................... 10-2018-0093943

(51) Int. Cl.
*H04W 36/06* (2009.01)
*H04W 72/04* (2009.01)
(Continued)

(52) U.S. Cl.
CPC ....... *H04W 36/06* (2013.01); *H04W 72/0453* (2013.01); *H04W 72/1257* (2013.01); *H04W 72/1263* (2013.01); *H04W 80/02* (2013.01)

(58) Field of Classification Search
CPC ............ H04W 36/06; H04W 72/0453; H04W 72/1257; H04W 72/1263; H04W 80/02; H04W 28/0289
See application file for complete search history.

(56) References Cited

U.S. PATENT DOCUMENTS

| 10,736,038 B2 * | 8/2020 | Li ..................... H04W 52/0216 |
| 2018/0098250 A1 * | 4/2018 | Vrzic ................ H04W 36/0016 |

(Continued)

FOREIGN PATENT DOCUMENTS

| WO | 2017222324 | 12/2017 |
| WO | 2018084760 | 5/2018 |

OTHER PUBLICATIONS

PCT International Application No. PCT/KR2019/009953, International Search Report dated Nov. 19, 2019, 2 pages.
(Continued)

*Primary Examiner* — Harry H Kim
(74) *Attorney, Agent, or Firm* — Lee Hong Degerman Kang Waimey

(57) ABSTRACT

A method and apparatus for triggering a transmission carrier reselection procedure for deactivated duplication in a wireless communication is provided. A wireless device selects a first carrier carrying a data unit, and selects a second carrier carrying a duplication of the data unit based on activation of the duplication of the data unit. The wireless device triggers a carrier reselection procedure based on deactivation of the duplication of the data unit.

8 Claims, 10 Drawing Sheets

(51) Int. Cl.
  *H04W 72/12*  (2009.01)
  *H04W 80/02*  (2009.01)
  *H04W 28/02*  (2009.01)

(56) References Cited

U.S. PATENT DOCUMENTS

2020/0077417 A1* 3/2020 Seok ................. H04W 72/1215
2020/0084659 A1* 3/2020 Pan ....................... H04W 76/15
2021/0336732 A1* 10/2021 Shi ........................ H04W 28/12

OTHER PUBLICATIONS

LG Electronics, "Introduction of PDCP duplication", 3GPP TSG RAN WG2 Meeting #102, R2-1808831, May 2018, 7 pages.
Ericsson, "Remaining issues for PDCP duplication in LTE", 3GPP TSG RAN WG2 Meeting #103, R2-1812130, Aug. 2018, 4 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Section 23.10 of 3GPP TS 36.300 V15.2.0, Jun. 2018, 8 pages.
3rd Generation Partnership Project (3GPP), "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Section 23.14 of 3GPP TS 36.300 V15.2.0, Jun. 2018, 7 pages.
3rd Generation Partnership Project (3GPP), "Technical Specification Group Radio Access Network; Evolved Universal Terrestrial Radio Access (E-UTRA); Medium Access Control (MAC) protocol specification (Release 15)," Section 5.14.1.3.1 of 3GPP TS 36.321 V15.2.0, Jul. 2018, 4 pages.
3rd Generation Partnership Project (3GPP), "Technical Specification Group Radio Access Network; Evolved Universal Terrestrial Radio Access (E-UTRA); Medium Access Control (MAC) protocol specification (Release 15)," Section 5.14.1.5 of 3GPP TS 36.321 V15.2.0, Jul. 2018, 3 pages.

* cited by examiner

METHOD AND APPARATUS FOR TRIGGERING TRANSMISSION CARRIER RESELECTION PROCEDURE FOR DEACTIVATED DUPLICATION IN WIRELESS COMMUNICATION SYSTEM

CROSS-REFERENCE TO RELATED APPLICATIONS

This application is the National Stage filing under 35 U.S.C. 371 of International Application No. PCT/KR2019/009953, filed on Aug. 8, 2019, which claims the benefit of earlier filing date and right of priority to Korean Patent Application No. 10-2018-0093943, filed on Aug. 10, 2018, the contents of which are all incorporated by reference herein in their entirety.

TECHNICAL FIELD

The present invention relates to wireless communications, and more particularly, to a method and apparatus for triggering a transmission carrier reselection procedure for deactivated duplication in a wireless communication system.

BACKGROUND

3rd generation partnership project (3GPP) long-term evolution (LTE) is a technology for enabling high-speed packet communications. Many schemes have been proposed for the LTE objective including those that aim to reduce user and provider costs, improve service quality, and expand and improve coverage and system capacity. The 3GPP LTE requires reduced cost per bit, increased service availability, flexible use of a frequency band, a simple structure, an open interface, and adequate power consumption of a terminal as an upper-level requirement.

Work has started in international telecommunication union (ITU) and 3GPP to develop requirements and specifications for new radio (NR) systems. 3GPP has to identify and develop the technology components needed for successfully standardizing the new RAT timely satisfying both the urgent market needs, and the more long-term requirements set forth by the ITU radio communication sector (ITU-R) international mobile telecommunications (IMT)-2020 process. Further, the NR should be able to use any spectrum band ranging at least up to 100 GHz that may be made available for wireless communications even in a more distant future.

The NR targets a single technical framework addressing all usage scenarios, requirements and deployment scenarios including enhanced mobile broadband (eMBB), massive machine-type-communications (mMTC), ultra-reliable and low latency communications (URLLC), etc. The NR shall be inherently forward compatible.

Vehicle-to-everything (V2X) communication is the passing of information from a vehicle to any entity that may affect the vehicle, and vice versa. It is a vehicular communication system that incorporates other more specific types of communication as vehicle-to-infrastructure (V2I), vehicle-to-network (V2N), vehicle-to-vehicle (V2V), vehicle-to-pedestrian (V2P), vehicle-to-device (V2D) and vehicle-to-grid (V2G).

The main motivations for V2X are road safety, traffic efficiency, and energy savings. There are two types of V2X communication technology depending on the underlying technology being used, i.e. wireless local area network (WLAN)-based, and cellular-based.

SUMMARY

Packet data convergence protocol (PDCP) packet duplication was introduced in 3GPP rel-15, especially for V2X communication. PDCP packet duplication is configured for a radio bearer (RB) by radio resource control (RRC) where two logical channels are configured for the RB. When activated, PDCP packet duplication allows sending the same PDCP protocol data unit (PDU) on two independent transmission paths: via the primary radio link control (RLC) entity and a secondary RLC entity, thus increasing reliability and reducing latency.

When the PDCP packet duplication is deactivated, it is better to leave/release a carrier where duplicated PDCP PDU was transmitted. However, currently it is not possible to leave/release a carrier where duplicated PDCP PDU was transmitted when the PDCP packet duplication is deactivated.

In an aspect, a method performed by a wireless device in a wireless communication system is provided. The method includes selecting a first carrier carrying a data unit, selecting a second carrier carrying a duplication of the data unit, and triggering a carrier reselection based on deactivation of the duplication of the data unit.

In another aspect, a wireless device in a wireless communication system is provided. The wireless device includes a memory, a transceiver, and a processor, operably coupled to the memory and the transceiver, and configured to select a first carrier carrying a data unit, select a second carrier carrying a duplication of the data unit, and trigger a carrier reselection based on deactivation of the duplication of the data unit.

It can be avoided to reserve resources in a carrier where duplicated PDCP PDU was transmitted, when PDCP packet duplication is deactivated.

DETAILED DESCRIPTION

The technical features described below may be used by a communication standard by the 3rd generation partnership project (3GPP) standardization organization, a communication standard by the institute of electrical and electronics engineers (IEEE), etc. For example, the communication standards by the 3GPP standardization organization include long-term evolution (LTE) and/or evolution of LTE systems. The evolution of LTE systems includes LTE-advanced (LTE-A), LTE-A Pro, and/or 5G new radio (NR). The communication standard by the IEEE standardization organization includes a wireless local area network (WLAN) system such as IEEE 802.11a/b/g/n/ac/ax. The above system uses various multiple access technologies such as orthogonal frequency division multiple access (OFDMA) and/or single carrier frequency division multiple access (SC-FDMA) for downlink (DL) and/or uplink (UL). For example, only OFDMA may be used for DL and only SC-FDMA may be used for UL. Alternatively, OFDMA and SC-FDMA may be used for DL and/or UL.

In this document, the term "/" and "," should be interpreted to indicate "and/or." For instance, the expression "A/B" may mean "A and/or B." Further, "A, B" may mean "A and/or B." Further, "A/B/C" may mean "at least one of A, B, and/or C." Also, "A, B, C" may mean "at least one of A, B, and/or C."

Further, in the document, the term "or" should be interpreted to indicate "and/or." For instance, the expression "A or B" may comprise 1) only A, 2) only B, and/or 3) both A and B. In other words, the term "or" in this document should be interpreted to indicate "additionally or alternatively."

Figure 1:
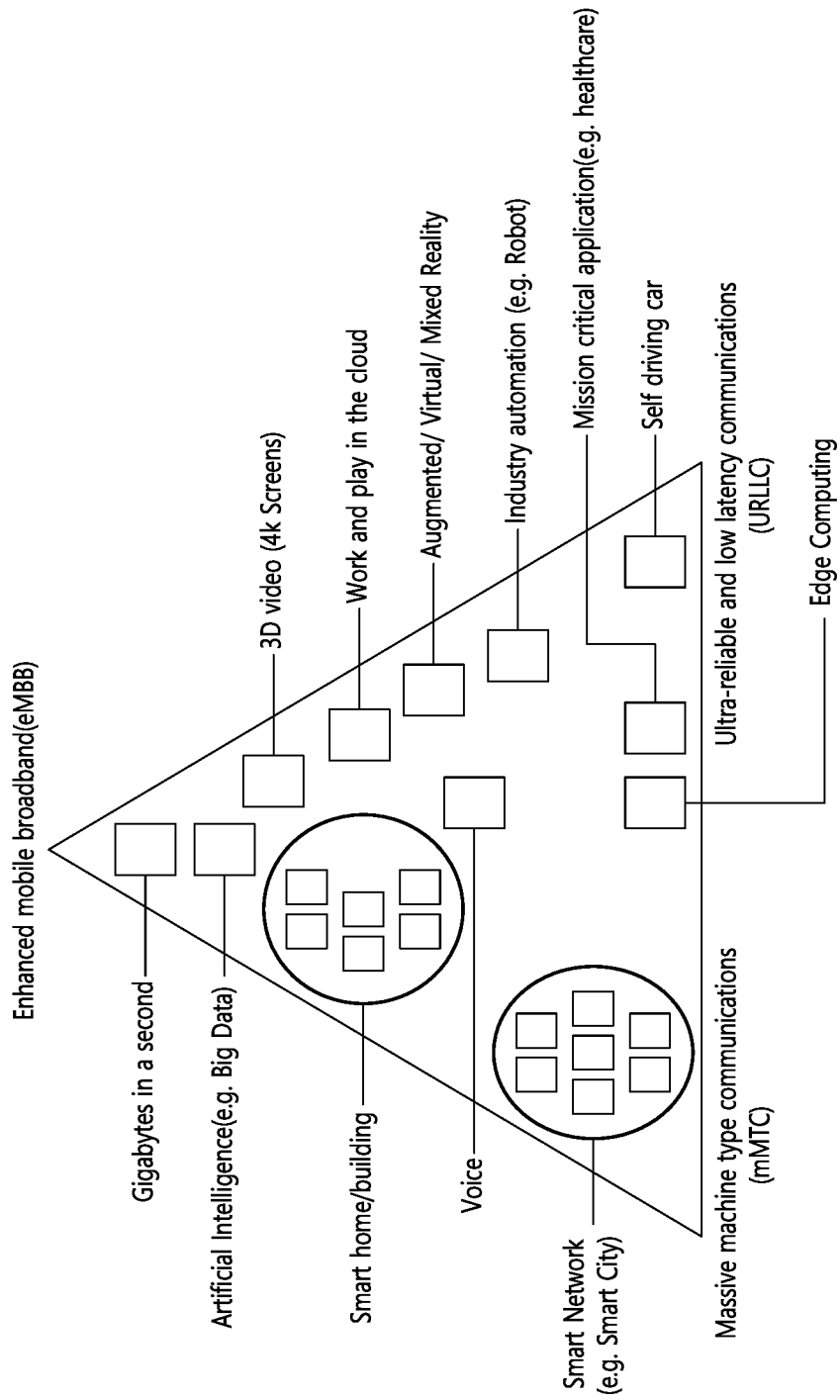
FIG. 1 shows examples of 5G usage scenarios to which the technical features of the present invention can be applied.

FIG. 1 shows examples of 5G usage scenarios to which the technical features of the present invention can be applied.

The 5G usage scenarios shown in FIG. 1 are only exemplary, and the technical features of the present invention can be applied to other 5G usage scenarios which are not shown in FIG. 1.

Referring to FIG. 1, the three main requirements areas of 5G include (1) enhanced mobile broadband (eMBB) domain, (2) massive machine type communication (mMTC) area, and (3) ultra-reliable and low latency communications (URLLC) area. Some use cases may require multiple areas for optimization and, other use cases may only focus on only one key performance indicator (KPI). 5G is to support these various use cases in a flexible and reliable way.

eMBB focuses on across-the-board enhancements to the data rate, latency, user density, capacity and coverage of mobile broadband access. The eMBB aims ~10 Gbps of throughput. eMBB far surpasses basic mobile Internet access and covers rich interactive work and media and entertainment applications in cloud and/or augmented reality. Data is one of the key drivers of 5G and may not be able to see dedicated voice services for the first time in the 5G era. In 5G, the voice is expected to be processed as an application simply using the data connection provided by the communication system. The main reason for the increased volume of traffic is an increase in the size of the content and an increase in the number of applications requiring high data rates. Streaming services (audio and video), interactive video and mobile Internet connectivity will become more common as more devices connect to the Internet. Many of these applications require always-on connectivity to push real-time information and notifications to the user. Cloud storage and applications are growing rapidly in mobile communication platforms, which can be applied to both work and entertainment. Cloud storage is a special use case that drives growth of uplink data rate. 5G is also used for remote tasks on the cloud and requires much lower end-to-end delay to maintain a good user experience when the tactile interface is used. In entertainment, for example, cloud games and video streaming are another key factor that increases the demand for mobile broadband capabilities. Entertainment is essential in smartphones and tablets anywhere, including high mobility environments such as trains, cars and airplanes. Another use case is augmented reality and information retrieval for entertainment. Here, augmented reality requires very low latency and instantaneous data amount.

mMTC is designed to enable communication between devices that are low-cost, massive in number and battery-driven, intended to support applications such as smart metering, logistics, and field and body sensors. mMTC aims ~10 years on battery and/or ~1 million devices/km2. mMTC allows seamless integration of embedded sensors in all areas and is one of the most widely used 5G applications. Potentially by 2020, internet-of-things (IoT) devices are expected to reach 20.4 billion. Industrial IoT is one of the areas where 5G plays a key role in enabling smart cities, asset tracking, smart utilities, agriculture and security infrastructures.

URLLC will make it possible for devices and machines to communicate with ultra-reliability, very low latency and high availability, making it ideal for vehicular communication, industrial control, factory automation, remote surgery, smart grids and public safety applications. URLLC aims ~1 ms of latency. URLLC includes new services that will change the industry through links with ultra-reliability/low latency, such as remote control of key infrastructure and self-driving vehicles. The level of reliability and latency is essential for smart grid control, industrial automation, robotics, drones control and coordination.

Next, a plurality of use cases included in the triangle of FIG. 1 will be described in more detail.

5G can complement fiber-to-the-home (FTTH) and cable-based broadband (or DOCSIS) as a means of delivering streams rated from hundreds of megabits per second to gigabits per second. This high speed can be required to deliver TVs with resolutions of 4K or more (6K, 8K and above) as well as virtual reality (VR) and augmented reality (AR). VR and AR applications include mostly immersive sporting events. Certain applications may require special network settings. For example, in the case of a VR game, a game company may need to integrate a core server with an edge network server of a network operator to minimize delay.

Automotive is expected to become an important new driver for 5G, with many use cases for mobile communications to vehicles. For example, entertainment for passengers demands high capacity and high mobile broadband at the same time. This is because future users will continue to expect high-quality connections regardless of their location and speed. Another use case in the automotive sector is an augmented reality dashboard. The driver can identify an object in the dark on top of what is being viewed through the front window through the augmented reality dashboard. The augmented reality dashboard displays information that will inform the driver about the object's distance and movement. In the future, the wireless module enables communication between vehicles, information exchange between the vehicle and the supporting infrastructure, and information exchange between the vehicle and other connected devices (e.g. devices accompanied by a pedestrian). The safety system allows the driver to guide the alternative course of action so that he can drive more safely, thereby reducing the risk of accidents. The next step will be a remotely controlled vehicle or self-driving vehicle. This requires a very reliable and very fast communication between different self-driving vehicles and between vehicles and infrastructure. In the future, a self-driving vehicle will perform all driving activities, and the driver will focus only on traffic that the vehicle itself cannot identify. The technical requirements of self-driving vehicles require ultra-low latency and high-speed reliability to increase traffic safety to a level not achievable by humans.

Smart cities and smart homes, which are referred to as smart societies, will be embedded in high density wireless sensor networks. The distributed network of intelligent sensors will identify conditions for cost and energy-efficient maintenance of a city or house. A similar setting can be performed for each home. Temperature sensors, windows and heating controllers, burglar alarms and appliances are all wirelessly connected. Many of these sensors typically require low data rate, low power and low cost. However, for example, real-time high-definition (HD) video may be required for certain types of devices for monitoring.

The consumption and distribution of energy, including heat or gas, is highly dispersed, requiring automated control of distributed sensor networks. The smart grid interconnects these sensors using digital information and communication technologies to collect and act on information. This information can include supplier and consumer behavior, allowing the smart grid to improve the distribution of fuel, such as electricity, in terms of efficiency, reliability, economy, production sustainability, and automated methods. The smart grid can be viewed as another sensor network with low latency.

The health sector has many applications that can benefit from mobile communications. Communication systems can support telemedicine to provide clinical care in remote locations. This can help to reduce barriers to distance and improve access to health services that are not continuously available in distant rural areas. It is also used to save lives in critical care and emergency situations. Mobile communication based wireless sensor networks can provide remote monitoring and sensors for parameters such as heart rate and blood pressure.

Wireless and mobile communications are becoming increasingly important in industrial applications. Wiring costs are high for installation and maintenance. Thus, the possibility of replacing a cable with a wireless link that can be reconfigured is an attractive opportunity in many industries. However, achieving this requires that wireless connections operate with similar delay, reliability, and capacity as cables and that their management is simplified. Low latency and very low error probabilities are new requirements that need to be connected to 5G.

Logistics and freight tracking are important use cases of mobile communications that enable tracking of inventory and packages anywhere using location based information systems. Use cases of logistics and freight tracking typically require low data rates, but require a large range and reliable location information.

Figure 2:
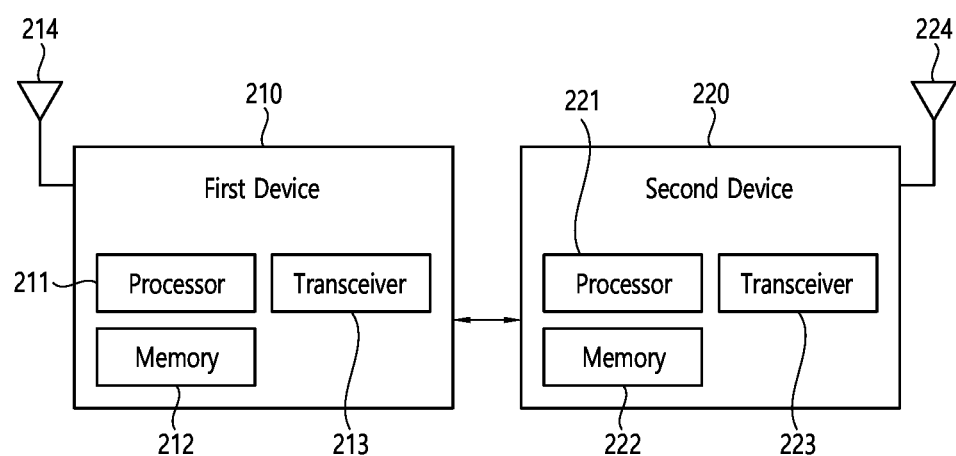
FIG. 2 shows an example of a wireless communication system to which the technical features of the present invention can be applied.

FIG. 2 shows an example of a wireless communication system to which the technical features of the present invention can be applied.

Referring to FIG. 2, the wireless communication system may include a first device 210 and a second device 220.

The first device 210 includes a base station, a network node, a transmitting UE, a receiving UE, a wireless device, a wireless communication device, a vehicle, a vehicle equipped with an autonomous driving function, a connected car, a drone, an unmanned aerial vehicle (UAV), an artificial intelligence (AI) module, a robot, an AR device, a VR device, a mixed reality (MR) device, a hologram device, a public safety device, an MTC device, an IoT device, a medical device, a fin-tech device (or, a financial device), a security device, a climate/environmental device, a device related to 5G services, or a device related to the fourth industrial revolution.

The second device 220 includes a base station, a network node, a transmitting UE, a receiving UE, a wireless device, a wireless communication device, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution.

For example, the UE may include a mobile phone, a smart phone, a laptop computer, a digital broadcasting terminal, a personal digital assistant (PDA), a portable multimedia player (PMP), a navigation device, a slate personal computer (PC), a tablet PC, an ultrabook, a wearable device (e.g. a smartwatch, a smart glass, a head mounted display (HMD)). For example, the HMD may be a display device worn on the head. For example, the HMD may be used to implement AR, VR and/or MR.

For example, the drone may be a flying object that is flying by a radio control signal without a person boarding it. For example, the VR device may include a device that implements an object or background in the virtual world. For example, the AR device may include a device that implements connection of an object and/or a background of a virtual world to an object and/or a background of the real world. For example, the MR device may include a device that implements fusion of an object and/or a background of a virtual world to an object and/or a background of the real world. For example, the hologram device may include a device that implements a 360-degree stereoscopic image by recording and playing stereoscopic information by utilizing a phenomenon of interference of light generated by the two laser lights meeting with each other, called holography. For example, the public safety device may include a video relay device or a video device that can be worn by the user's body. For example, the MTC device and the IoT device may be a device that do not require direct human intervention or manipulation. For example, the MTC device and the IoT device may include a smart meter, a vending machine, a thermometer, a smart bulb, a door lock and/or various sensors. For example, the medical device may be a device used for the purpose of diagnosing, treating, alleviating, handling, or preventing a disease. For example, the medical device may be a device used for the purpose of diagnosing, treating, alleviating, or correcting an injury or disorder. For example, the medical device may be a device used for the purpose of inspecting, replacing or modifying a structure or function. For example, the medical device may be a device used for the purpose of controlling pregnancy. For example, the medical device may include a treatment device, a surgical device, an (in vitro) diagnostic device, a hearing aid and/or a procedural device, etc. For example, a security device may be a device installed to prevent the risk that may occur and to maintain safety. For example, the security device may include a camera, a closed-circuit TV (CCTV), a recorder, or a black box. For example, the fin-tech device may be a device capable of providing financial services such as mobile payment. For example, the fin-tech device may include a payment device or a point of sales (POS). For example, the climate/environmental device may include a device for monitoring or predicting the climate/environment.

The first device 210 may include at least one or more processors, such as a processor 211, at least one memory, such as a memory 212, and at least one transceiver, such as a transceiver 213. The processor 211 may perform the functions, procedures, and/or methods of the present invention described below. The processor 211 may perform one or more protocols. For example, the processor 211 may perform one or more layers of the air interface protocol. The memory 212 is connected to the processor 211 and may store various types of information and/or instructions. The transceiver 213 is connected to the processor 211 and may be controlled to transmit and receive wireless signals.

The second device 220 may include at least one or more processors, such as a processor 221, at least one memory, such as a memory 222, and at least one transceiver, such as a transceiver 223. The processor 221 may perform the functions, procedures, and/or methods of the present invention described below. The processor 221 may perform one or more protocols. For example, the processor 221 may perform one or more layers of the air interface protocol. The memory 222 is connected to the processor 221 and may store various types of information and/or instructions. The transceiver 223 is connected to the processor 221 and may be controlled to transmit and receive wireless signals.

The memory 212, 222 may be connected internally or externally to the processor 211, 212, or may be connected to other processors via a variety of technologies such as wired or wireless connections.

The first device 210 and/or the second device 220 may have more than one antenna. For example, antenna 214 and/or antenna 224 may be configured to transmit and receive wireless signals.

Figure 3:
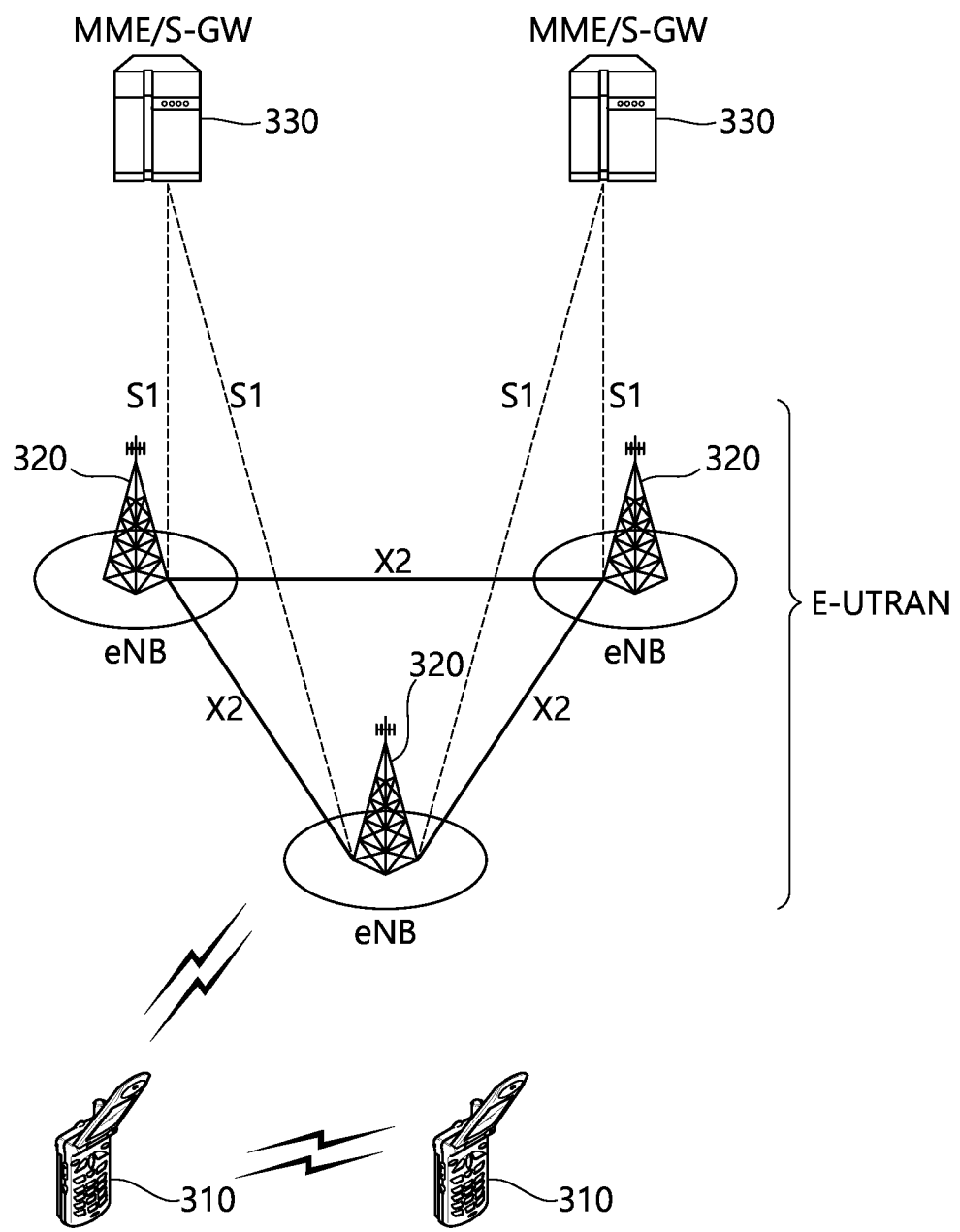
FIG. 3 shows an example of a wireless communication system to which the technical features of the present invention can be applied.

FIG. 3 shows an example of a wireless communication system to which the technical features of the present invention can be applied.

Specifically, FIG. 3 shows a system architecture based on an evolved-UMTS terrestrial radio access network (E-UTRAN). The aforementioned LTE is a part of an evolved-UMTS (e-UMTS) using the E-UTRAN.

Referring to FIG. 3, the wireless communication system includes one or more user equipment (UE) 310, an E-UTRAN and an evolved packet core (EPC). The UE 310 refers to a communication equipment carried by a user. The UE 310 may be fixed or mobile. The UE 310 may be referred to as another terminology, such as a mobile station (MS), a user terminal (UT), a subscriber station (SS), a wireless device, etc.

The E-UTRAN consists of one or more evolved NodeB (eNB) 320. The eNB 320 provides the E-UTRA user plane and control plane protocol terminations towards the UE 10. The eNB 320 is generally a fixed station that communicates with the UE 310. The eNB 320 hosts the functions, such as inter-cell radio resource management (RRM), radio bearer (RB) control, connection mobility control, radio admission control, measurement configuration/provision, dynamic resource allocation (scheduler), etc. The eNB 320 may be referred to as another terminology, such as a base station (BS), a base transceiver system (BTS), an access point (AP), etc.

A downlink (DL) denotes communication from the eNB 320 to the UE 310. An uplink (UL) denotes communication from the UE 310 to the eNB 320. A sidelink (SL) denotes communication between the UEs 310. In the DL, a transmitter may be a part of the eNB 320, and a receiver may be a part of the UE 310. In the UL, the transmitter may be a part of the UE 310, and the receiver may be a part of the eNB 320. In the SL, the transmitter and receiver may be a part of the UE 310.

The EPC includes a mobility management entity (MME), a serving gateway (S-GW) and a packet data network (PDN) gateway (P-GW). The MME hosts the functions, such as non-access stratum (NAS) security, idle state mobility handling, evolved packet system (EPS) bearer control, etc. The S-GW hosts the functions, such as mobility anchoring, etc. The S-GW is a gateway having an E-UTRAN as an endpoint. For convenience, MME/S-GW 330 will be referred to herein simply as a "gateway," but it is understood that this entity includes both the MME and S-GW. The P-GW hosts the functions, such as UE Internet protocol (IP) address allocation, packet filtering, etc. The P-GW is a gateway having a PDN as an endpoint. The P-GW is connected to an external network.

The UE 310 is connected to the eNB 320 by means of the Uu interface. The UEs 310 are interconnected with each other by means of the PC5 interface. The eNBs 320 are interconnected with each other by means of the X2 interface. The eNBs 320 are also connected by means of the S1 interface to the EPC, more specifically to the MME by means of the S1-MME interface and to the S-GW by means of the S1-U interface. The S1 interface supports a many-to-many relation between MMEs/S-GWs and eNBs.

Figure 4:
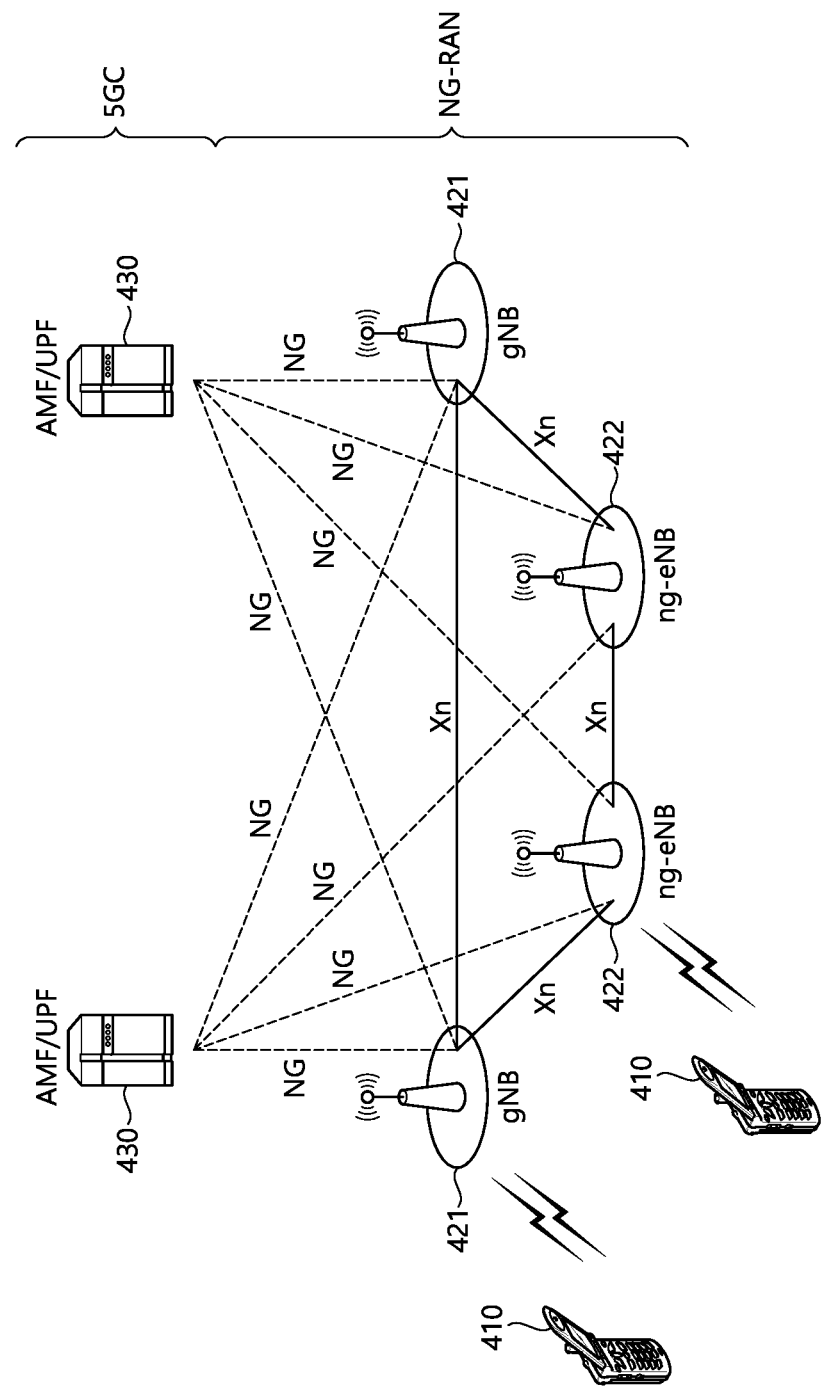
FIG. 4 shows another example of a wireless communication system to which the technical features of the present invention can be applied.

FIG. 4 shows another example of a wireless communication system to which the technical features of the present invention can be applied.

Specifically, FIG. 4 shows a system architecture based on a 5G NR. The entity used in the 5G NR (hereinafter, simply referred to as "NR") may absorb some or all of the functions of the entities introduced in FIG. 3 (e.g. eNB, MME, S-GW). The entity used in the NR may be identified by the name "NG" for distinction from the LTE/LTE-A.

Referring to FIG. 4, the wireless communication system includes one or more UE 410, a next-generation RAN (NG-RAN) and a 5th generation core network (5GC). The NG-RAN consists of at least one NG-RAN node. The NG-RAN node is an entity corresponding to the eNB 320 shown in FIG. 3. The NG-RAN node consists of at least one gNB 421 and/or at least one ng-eNB 422. The gNB 421 provides NR user plane and control plane protocol terminations towards the UE 410. The ng-eNB 422 provides E-UTRA user plane and control plane protocol terminations towards the UE 410.

The 5GC includes an access and mobility management function (AMF), a user plane function (UPF) and a session management function (SMF). The AMF hosts the functions, such as NAS security, idle state mobility handling, etc. The AMF is an entity including the functions of the conventional MME. The UPF hosts the functions, such as mobility anchoring, protocol data unit (PDU) handling. The UPF an entity including the functions of the conventional S-GW. The SMF hosts the functions, such as UE IP address allocation, PDU session control.

The gNBs 421 and ng-eNBs 422 are interconnected with each other by means of the Xn interface. The gNBs 421 and ng-eNBs 422 are also connected by means of the NG interfaces to the 5GC, more specifically to the AMF by means of the NG-C interface and to the UPF by means of the NG-U interface.

A protocol structure between network entities described above is described. On the system of FIG. 3 and/or FIG. 4, layers of a radio interface protocol between the UE and the network (e.g. NG-RAN and/or E-UTRAN) may be classified into a first layer (L1), a second layer (L2), and a third layer (L3) based on the lower three layers of the open system interconnection (OSI) model that is well-known in the communication system.

Figure 5:
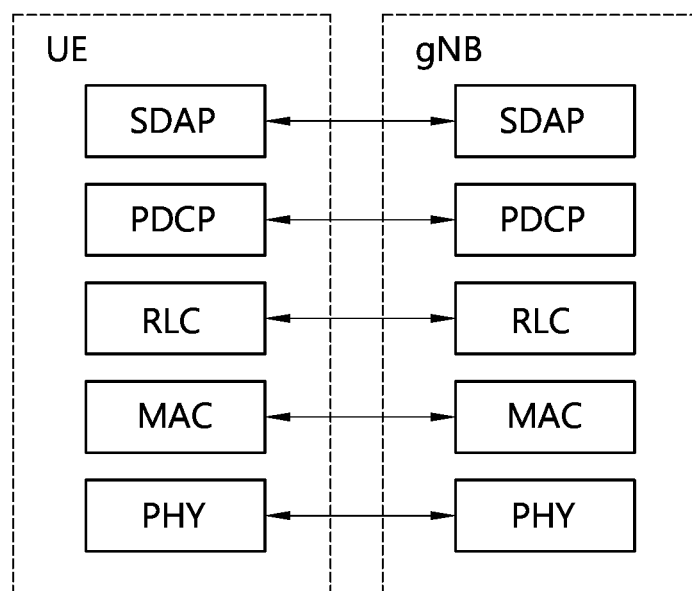
FIG. 5 shows a block diagram of a user plane protocol stack to which the technical features of the present invention can be applied.
Figure 6:
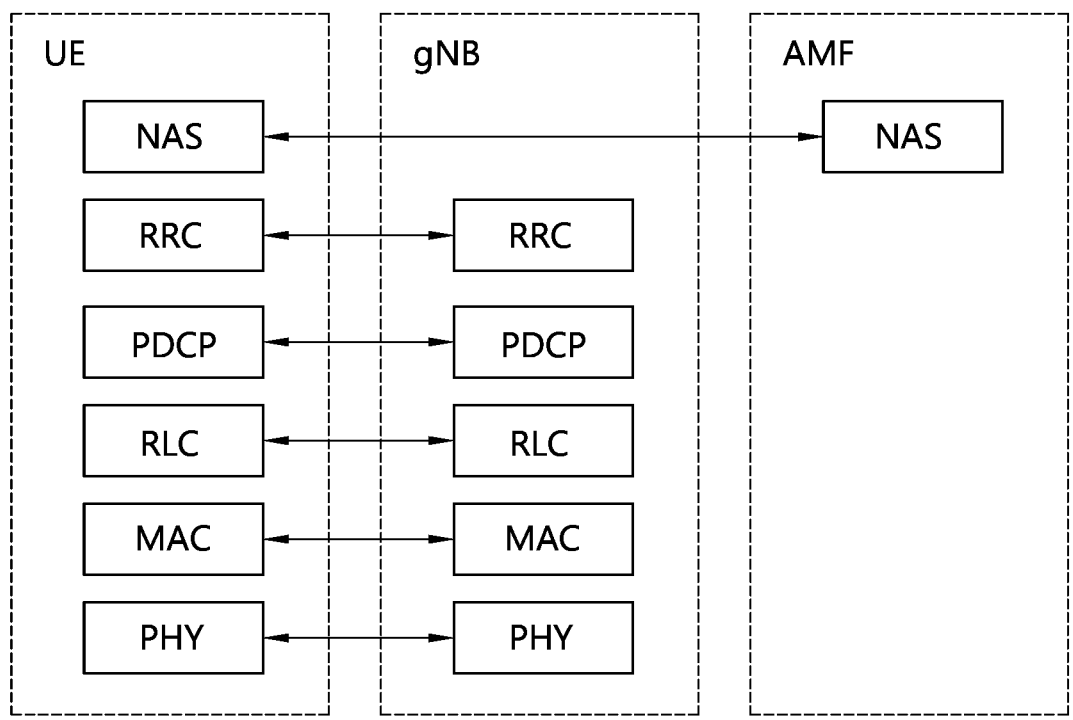
FIG. 6 shows a block diagram of a control plane protocol stack to which the technical features of the present invention can be applied.

FIG. 5 shows a block diagram of a user plane protocol stack to which the technical features of the present invention can be applied. FIG. 6 shows a block diagram of a control plane protocol stack to which the technical features of the present invention can be applied.

The user/control plane protocol stacks shown in FIG. 5 and FIG. 6 are used in NR. However, user/control plane protocol stacks shown in FIG. 5 and FIG. 6 may be used in LTE/LTE-A without loss of generality, by replacing gNB/AMF with eNB/MME.

Referring to FIG. 5 and FIG. 6, a physical (PHY) layer belonging to L1. The PHY layer offers information transfer services to media access control (MAC) sublayer and higher layers. The PHY layer offers to the MAC sublayer transport channels. Data between the MAC sublayer and the PHY layer is transferred via the transport channels. Between different PHY layers, i.e., between a PHY layer of a transmission side and a PHY layer of a reception side, data is transferred via the physical channels.

The MAC sublayer belongs to L2. The main services and functions of the MAC sublayer include mapping between logical channels and transport channels, multiplexing/demultiplexing of MAC service data units (SDUs) belonging to one or different logical channels into/from transport blocks (TB) delivered to/from the physical layer on transport channels, scheduling information reporting, error correction through hybrid automatic repeat request (HARQ), priority handling between UEs by means of dynamic scheduling, priority handling between logical channels of one UE by means of logical channel prioritization (LCP), etc. The MAC sublayer offers to the radio link control (RLC) sublayer logical channels.

The RLC sublayer belong to L2. The RLC sublayer supports three transmission modes, i.e. transparent mode (TM), unacknowledged mode (UM), and acknowledged mode (AM), in order to guarantee various quality of services (QoS) required by radio bearers. The main services and functions of the RLC sublayer depend on the transmission mode. For example, the RLC sublayer provides transfer of upper layer PDUs for all three modes, but provides error correction through ARQ for AM only. In LTE/LTE-A, the RLC sublayer provides concatenation, segmentation and reassembly of RLC SDUs (only for UM and AM data transfer) and re-segmentation of RLC data PDUs (only for AM data transfer). In NR, the RLC sublayer provides segmentation (only for AM and UM) and re-segmentation (only for AM) of RLC SDUs and reassembly of SDU (only for AM and UM). That is, the NR does not support concatenation of RLC SDUs. The RLC sublayer offers to the packet data convergence protocol (PDCP) sublayer RLC channels.

The PDCP sublayer belong to L2. The main services and functions of the PDCP sublayer for the user plane include header compression and decompression, transfer of user data, duplicate detection, PDCP PDU routing, retransmission of PDCP SDUs, ciphering and deciphering, etc. The main services and functions of the PDCP sublayer for the control plane include ciphering and integrity protection, transfer of control plane data, etc.

The service data adaptation protocol (SDAP) sublayer belong to L2. The SDAP sublayer is only defined in the user plane. The SDAP sublayer is only defined for NR. The main services and functions of SDAP include, mapping between a QoS flow and a data radio bearer (DRB), and marking QoS flow ID (QFI) in both DL and UL packets. The SDAP sublayer offers to 5GC QoS flows.

A radio resource control (RRC) layer belongs to L3. The RRC layer is only defined in the control plane. The RRC layer controls radio resources between the UE and the network. To this end, the RRC layer exchanges RRC messages between the UE and the BS. The main services and functions of the RRC layer include broadcast of system information related to AS and NAS, paging, establishment, maintenance and release of an RRC connection between the UE and the network, security functions including key management, establishment, configuration, maintenance and release of radio bearers, mobility functions, QoS management functions, UE measurement reporting and control of the reporting, NAS message transfer to/from NAS from/to UE.

In other words, the RRC layer controls logical channels, transport channels, and physical channels in relation to the configuration, reconfiguration, and release of radio bearers. A radio bearer refers to a logical path provided by L1 (PHY layer) and L2 (MAC/RLC/PDCP/SDAP sublayer) for data transmission between a UE and a network. Setting the radio bearer means defining the characteristics of the radio protocol layer and the channel for providing a specific service, and setting each specific parameter and operation method. Radio bearer may be divided into signaling RB (SRB) and data RB (DRB). The SRB is used as a path for transmitting RRC messages in the control plane, and the DRB is used as a path for transmitting user data in the user plane.

An RRC state indicates whether an RRC layer of the UE is logically connected to an RRC layer of the E-UTRAN. In LTE/LTE-A, when the RRC connection is established between the RRC layer of the UE and the RRC layer of the E-UTRAN, the UE is in the RRC connected state (RRC_CONNECTED). Otherwise, the UE is in the RRC idle state (RRC_IDLE). In NR, the RRC inactive state (RRC_INACTIVE) is additionally introduced. RRC_INACTIVE may be used for various purposes. For example, the massive machine type communications (MMTC) UEs can be efficiently managed in RRC_INACTIVE. When a specific condition is satisfied, transition is made from one of the above three states to the other.

A predetermined operation may be performed according to the RRC state. In RRC_IDLE, public land mobile network (PLMN) selection, broadcast of system information (SI), cell re-selection mobility, core network (CN) paging and discontinuous reception (DRX) configured by NAS may be performed. The UE shall have been allocated an identifier (ID) which uniquely identifies the UE in a tracking area. No RRC context stored in the BS.

In RRC_CONNECTED, the UE has an RRC connection with the network (i.e. E-UTRAN/NG-RAN). Network-CN connection (both C/U-planes) is also established for UE. The UE AS context is stored in the network and the UE. The RAN knows the cell which the UE belongs to. The network can transmit and/or receive data to/from UE. Network controlled mobility including measurement is also performed.

Most of operations performed in RRC_IDLE may be performed in RRC_INACTIVE. But, instead of CN paging in RRC_IDLE, RAN paging is performed in RRC_INACTIVE. In other words, in RRC_IDLE, paging for mobile terminated (MT) data is initiated by core network and paging area is managed by core network. In RRC_INACTIVE, paging is initiated by NG-RAN, and RAN-based notification area (RNA) is managed by NG-RAN. Further, instead of DRX for CN paging configured by NAS in RRC_IDLE, DRX for RAN paging is configured by NG-RAN in RRC_INACTIVE. Meanwhile, in RRC_INACTIVE, 5GC-NG-RAN connection (both C/U-planes) is established for UE, and the UE AS context is stored in NG-RAN and the UE. NG-RAN knows the RNA which the UE belongs to.

NAS layer is located at the top of the RRC layer. The NAS control protocol performs the functions, such as authentication, mobility management, security control.

The physical channels may be modulated according to OFDM processing and utilizes time and frequency as radio resources. The physical channels consist of a plurality of orthogonal frequency division multiplexing (OFDM) symbols in time domain and a plurality of subcarriers in frequency domain. One subframe consists of a plurality of OFDM symbols in the time domain A resource block is a resource allocation unit, and consists of a plurality of OFDM symbols and a plurality of subcarriers. In addition, each subframe may use specific subcarriers of specific OFDM symbols (e.g. first OFDM symbol) of the corresponding subframe for a physical downlink control channel (PDCCH), i.e. L1/L2 control channel. A transmission time interval (TTI) is a basic unit of time used by a scheduler for resource allocation. The TTI may be defined in units of one or a plurality of slots, or may be defined in units of mini-slots.

The transport channels are classified according to how and with what characteristics data are transferred over the radio interface. DL transport channels include a broadcast channel (BCH) used for transmitting system information, a downlink shared channel (DL-SCH) used for transmitting user traffic or control signals, and a paging channel (PCH) used for paging a UE. UL transport channels include an uplink shared channel (UL-SCH) for transmitting user traffic or control signals and a random access channel (RACH) normally used for initial access to a cell.

Different kinds of data transfer services are offered by MAC sublayer. Each logical channel type is defined by what type of information is transferred. Logical channels are classified into two groups: control channels and traffic channels.

Control channels are used for the transfer of control plane information only. The control channels include a broadcast control channel (BCCH), a paging control channel (PCCH), a common control channel (CCCH) and a dedicated control channel (DCCH). The BCCH is a DL channel for broadcasting system control information. The PCCH is DL channel that transfers paging information, system information change notifications. The CCCH is a channel for transmitting control information between UEs and network. This channel is used for UEs having no RRC connection with the network. The DCCH is a point-to-point bi-directional channel that transmits dedicated control information between a UE and the network. This channel is used by UEs having an RRC connection.

Traffic channels are used for the transfer of user plane information only. The traffic channels include a dedicated traffic channel (DTCH). The DTCH is a point-to-point channel, dedicated to one UE, for the transfer of user information. The DTCH can exist in both UL and DL.

Regarding mapping between the logical channels and transport channels, in DL, BCCH can be mapped to BCH, BCCH can be mapped to DL-SCH, PCCH can be mapped to PCH, CCCH can be mapped to DL-SCH, DCCH can be mapped to DL-SCH, and DTCH can be mapped to DL-SCH. In UL, CCCH can be mapped to UL-SCH, DCCH can be mapped to UL-SCH, and DTCH can be mapped to UL-SCH.

Examples of sidelink communication are described next. These techniques may encompass certain aspects of V2X sidelink communication, but are not limited thereto. Sidelink communication in the scenario of V2X communications (V2X sidelink communication) will be provided further below, following the description of more general sidelink communication.

In some implementations, the examples of sidelink communication described below may be compliant with 3GPP technical standard TS 36.300 V15.2.0 (2018 June), Section 23.10. In some scenarios, sidelink communication generally encompasses a UE to UE interface for sidelink communication, vehicle-to-everything (V2X) sidelink communication and sidelink discovery. In some implementations, the sidelink corresponds to the PC5 interface. Sidelink transmissions may be defined for sidelink discovery, sidelink communication, and V2X sidelink communication between UEs. In some implementations, sidelink transmissions use the same frame structure as the frame structure that is defined for UL and DL when UEs are in network coverage. However, in some scenarios, the sidelink transmission may be restricted to a sub-set of the UL resources in the time and frequency domains. Various physical channels, transport channels, and logical channels may be implemented and utilized for sidelink transmission.

In some implementations, sidelink communication is a mode of communication whereby UEs can communicate with each other directly over the PC5 interface. This communication mode is supported when the UE is served by E-UTRAN and when the UE is outside of E-UTRA coverage. In some scenarios, only those UEs authorized to be used for public safety operation can perform sidelink communication. The terminology "sidelink communication" without "V2X" prefix may, in some scenarios, only concern public safety unless specifically stated otherwise.

In order to perform synchronization for out of coverage operation, the UE(s) may act as a synchronization source by transmitting a sidelink broadcast control channel (SBCCH) and a synchronization signal. In some scenarios, SBCCH carries the most essential system information needed to receive other sidelink channels and signals. In some implementations, SBCCH along with a synchronization signal is transmitted with a fixed periodicity of 40 ms. When the UE is in network coverage, the contents of SBCCH may be derived from the parameters signaled by the BS. When the UE is out of coverage, if the UE selects another UE as a synchronization reference, then the content of SBCCH may be derived from the received SBCCH.

Otherwise, in some implementations, the UE uses pre-configured parameters. For example, system information block type-18 (SIB18) provides the resource information for the synchronization signal and SBCCH transmission. In some scenarios, there are two pre-configured subframes every 40 ms for out of coverage operation. The UE may receive the synchronization signal and SBCCH in one subframe and transmit synchronization signal and SBCCH on another subframe if the UE becomes a synchronization source based on a criterion.

In some implementations, the UE performs sidelink communication on subframes defined over the duration of sidelink control (SC) period. The SC period is the period over which resources allocated in a cell for sidelink control information (SCI) and sidelink data transmissions occur. Within the SC period, the UE sends SCI followed by sidelink data. SCI indicates a Layer 1 ID and characteristics of the transmissions (e.g., modulation and coding scheme (MCS), location of the resource(s) over the duration of SC period, timing alignment).

In some implementations, the UE performs transmission and reception over Uu and PC5 with the following decreasing priority order in case sidelink discovery gap is not configured:
Uu transmission/reception (highest priority);
PC5 sidelink communication transmission/reception;
PC5 sidelink discovery announcement/monitoring (lowest priority).

In some implementations, the UE performs transmission and reception over Uu and PC5 with the following decreasing priority order in case sidelink discovery gap is configured:
Uu transmission/reception for RACH;
PC5 sidelink discovery announcement during a sidelink discovery gap for transmission;
Non-RACH Uu transmission;
PC5 sidelink discovery monitoring during a sidelink discovery gap for reception;
Non-RACH Uu reception;
PC5 sidelink communication transmission/reception.

A UE supporting sidelink communication may, in some implementations, operate in two modes for resource allocation. The first mode is a scheduled resource allocation mode, which may be referred to as "Mode 1" for resource allocation of sidelink communication. In Mode 1, the UE needs to be RRC_CONNECTED in order to transmit data. The UE requests transmission resources from a base station (BS) and the BS schedules transmission resources for transmission of sidelink control information and sidelink data. The UE sends a scheduling request (e.g., a dedicated scheduling request (D-SR) or random access) to the BS followed by a sidelink buffer status report (BSR). Based on the sidelink BSR, the BS may determine that the UE has data for a sidelink communication transmission, and may estimate the resources needed for transmission. The BS may then schedule transmission resources for sidelink communication using a configured sidelink radio network temporary identity (SL-RNTI). Therefore, in such scenarios, a UE that is in the RRC_CONNECTED state and that is to perform a sidelink communication may send a sidelink UE information message to a BS. In response, the BS may configure the UE with a SL-RNTI.

The second mode of resource allocation for sidelink communication is a UE autonomous resource selection mode, which may be referred to as "Mode 2" for resource allocation of sidelink communication. In Mode 2, a UE selects resources from one or more resource pools and performs selection of a transport format to transmit sidelink control information and data. In some scenarios, there may be up to 8 transmission resource pools either pre-configured for out of coverage operation or provided by RRC signaling for in-coverage operation. Each resource pool may have one or more priority levels (e.g., one or more ProSe per-packet priority (PPPP)) associated with it. As an example, for transmission of a MAC PDU, the UE selects a transmission pool in which one of the associated PPPP is equal to the PPPP of a logical channel with highest PPPP among the logical channel identified in the MAC PDU. In some implementations, it is up to UE implementation how the UE selects amongst multiple pools with same associated PPPP. There is a one to one association between sidelink control pool and sidelink data pool. Once the resource pool is selected, in some scenarios, the selection is valid for an entire sidelink control (SC) period. After the SC period is finished, the UE may perform resource pool selection again. The UE is allowed to perform multiple transmissions to different destinations in a single SC period.

Having provided various examples of general sidelink communication above, next, some examples of sidelink communication in the scenario of V2X communications (V2X sidelink communication) are described.

In some implementations, the techniques of V2X sidelink communication described below may be compliant with technical standard 3GPP TS 36.300 V15.2.0 (2018 June), e.g., Section 23.14. In general, V2X services may consist of various types, such as vehicle-to-vehicle (V2V) services, vehicle-to-infrastructure (V2I) services, vehicle-to-nomadic (V2N) services, and vehicle-to-pedestrian (V2P) services.

V2X services may be provided by PC5 interface and/or Uu interface, according to some implementations. Support of V2X services via PC5 interface is provided by V2X sidelink communication, which is a mode of communication whereby UEs communicate with each other directly over the PC5 interface. This communication mode is supported when the UE is served by E-UTRAN and when the UE is outside of E-UTRA coverage. In some implementations, only UEs that are authorized for V2X services may perform V2X sidelink communication.

V2X sidelink communication may implement and utilize a user plane protocol stack and functions for sidelink communication. In addition, according to some implementations of V2X sidelink communication:
Sidelink traffic channel (STCH) for sidelink communication is also used for V2X sidelink communication.
Non-V2X (e.g., public safety related) data is not multiplexed with V2X data transmitted in resources configured for V2X sidelink communication.
The access stratum (AS) is provided with the PPPP and ProSe per-packet reliability (PPPR) of a protocol data unit transmitted over PC5 interface by higher layers. The packet delay budget (PDB) of the protocol data unit can be determined from the PPPP. The low PDB is mapped to the high priority PPPP value.
The AS is provided with a transmit profile of a protocol data unit transmitted over PC5 interface by upper layers.
The logical channel prioritization based on PPPP is used for V2X sidelink communication.
Control plane protocol stack for SBCCH for sidelink communication is also used for V2X sidelink communication.

A UE supporting V2X sidelink communication may, in some implementations, operate in two modes for resource allocation. The first mode is a scheduled resource allocation, which may be referred to as "Mode 3" for resource allocation of V2X sidelink communication. In Mode 3, the UE needs to be RRC_CONNECTED in order to transmit data. The UE requests transmission resources from a BS, and the BS schedules transmission resources for transmission of sidelink control information and data. Sidelink semi-persistent scheduling (SPS) is supported for the Mode 3.

The second mode of resource allocation for V2X sidelink communication is a UE autonomous resource selection, which may be referred to as "Mode 4" for resource allocation of V2X sidelink communication. In Mode 4, the UE selects resources from one or more resource pools and performs selection of transport format to transmit sidelink control information and data. In scenarios where mapping between the zones and V2X sidelink transmission resource pools is configured, the UE selects a V2X sidelink resource pool based on the zone in which the UE is located. The UE may perform sensing for selection (or re-selection) of sidelink resources. Based on the sensing results, the UE may select (or re-select) specific sidelink resources and may reserve multiple sidelink resources. In some scenarios, up to 2 parallel independent resource reservation processes are allowed to be performed by the UE. The UE is also allowed to perform a single resource selection for its V2X sidelink transmission.

An RRC_CONNECTED UE may send a sidelink UE information message to the serving cell if it is interested in V2X sidelink communication transmission in order to request sidelink resources.

A UE is considered in-coverage on the carrier used for V2X sidelink communication whenever it detects a cell on that carrier as per criteria. If the UE that is authorized for V2X sidelink communication is in-coverage on the frequency used for V2X sidelink communication or if the BS provides V2X sidelink configuration for that frequency (including the case where UE is out of coverage on that frequency), the UE uses Mode 3 or Mode 4 as per BS configuration. When the UE is out of coverage on the frequency used for V2X sidelink communication and if the BS does not provide V2X sidelink configuration for that frequency, the UE may use a set of transmission and reception resource pools pre-configured in the UE. V2X sidelink communication resources are not shared with other non-V2X data transmitted over sidelink.

If the UE is configured by higher layers to receive V2X sidelink communication and V2X sidelink reception resource pools are provided, the UE performs reception on those provided resources.

In some scenarios, reception of sidelink V2X communication in different carriers/PLMNs can may supported by having multiple receiver chains in the UE.

For controlling channel utilization, according to some implementations, the network is able to indicate how the UE adapts its transmission parameters for each transmission pool depending on a measure of congestion on the channel, e.g., a channel busy ratio (CBR). The UE may measure all the configured transmission pools including an exceptional pool. If a pool is (pre)configured such that a UE shall always transmit physical sidelink control channel (PSCCH) and physical sidelink shared channel (PSSCH) in adjacent resource blocks, then the UE measures PSCCH and PSSCH resources together. If a pool is (pre)configured such that a UE may transmit PSCCH and the corresponding PSSCH in non-adjacent resource blocks in a subframe, then PSSCH pool and PSCCH pool are measured separately.

A UE in RRC_CONNECTED may be configured to report CBR measurement results. For CBR reporting, periodic reporting and event triggered reporting are supported. In some implementations, two types of reporting events may be utilized for event-triggered CBR reporting. As one type of reporting event, in scenarios where PSSCH and PSCCH resources are placed non-adjacently, then only PSSCH pool measurement is used for event-triggered CBR reporting. As another type of reporting event, in scenarios where PSSCH and PSCCH resources are placed adjacently, then CBR measurement of both the PSSCH and PSCCH resources is used for event-triggered CBR reporting. In some implementations, CBR event-triggered reporting is triggered by an overloaded threshold and/or a less-loaded threshold. The network may configure which of the transmission pools the UE needs to report.

In some implementations, a UE (regardless of its RRC state) performs transmission parameter adaptation based on the measured CBR. In scenarios where PSSCH and PSCCH resources are placed non-adjacently, only PSSCH pool measurement is used for transmission parameter adaptation. In scenarios where PSSCH and PSCCH resources are placed adjacently, CBR measurement of both the PSSCH and PSCCH resources is used for transmission parameter adaptation. When CBR measurements are not available, default transmission parameters may be used. Examples of adapted transmission parameters include maximum transmission power, range of the number of retransmission per TB, range of PSSCH RB number, range of MCS, and maximum limit on channel occupancy ratio. The transmission parameter adaption may apply to all transmission pools including an exceptional pool.

Sidelink transmission and/or reception resources including an exceptional pool for different frequencies, for both scheduled resource allocation and UE autonomous resource selection, may be provided. The sidelink resources for different frequencies may be provided via dedicated signaling, SIB21 and/or via pre-configuration. The serving cell may indicate to the UE only the frequency on which the UE may acquire the sidelink resource configuration. If multiple frequencies and associated resource information are provided, it is up to UE implementation to select the frequency among the provided frequencies, according to some implementations. In some scenarios, the UE shall not use preconfigured transmission resource if the UE detects a cell providing resource configuration or inter-carrier resource configuration for V2X sidelink communication. Frequencies which may provide V2X sidelink communication resource configuration or cross-carrier configuration may be pre-configured. The RRC_IDLE UE may prioritize the frequency that provides resource configuration for V2X sidelink communication for other carrier during cell reselection.

If a UE supports multiple transmission chains, then the UE may simultaneously transmit on multiple carriers via the PC5 interface. In scenarios where multiple frequencies for V2X are supported, a mapping between V2X service types and V2X frequencies is configured by upper layers. In some implementations, the UE should ensure a V2X service to be transmitted on the corresponding frequency. For Mode 3, the BS may schedule a V2X transmission on a frequency based on the sidelink BSR, in which the UE includes a destination index that is uniquely associated with a frequency reported by the UE to the BS in a sidelink UE information message.

Carrier aggregation (CA) in sidelink is supported for V2X sidelink communication. It applies to both in coverage UEs and out of coverage UEs. For CA in sidelink, neither primary component carrier (PCC) nor secondary component carriers (SCCs) are defined. Each resource pool (pre)configured for V2X sidelink communication transmission or reception is associated to a single carrier. When a UE supporting CA in sidelink uses Mode 4, it performs carrier selection and may select one or more carriers used for V2X sidelink communication transmission. The carrier selection is performed at MAC layer, depending on the CBR of the (pre)configured carriers for V2X sidelink communication and the PPPP(s) of the V2X messages to be transmitted. The carrier reselection may be performed when resource reselection is triggered and is triggered for each sidelink process. In order to avoid frequent switching across different carriers, the UE may keep using a carrier already selected for transmission, if the measured CBR on this carrier is lower than a (pre)configured threshold. For a UE using Mode 4, logical channel prioritization is performed for a sidelink resource on a carrier depending on the CBR measured on the carrier and the PPPP of the sidelink logical channels.

Sidelink packet duplication is supported for V2X sidelink communication and is performed at PDCP layer of the UE. For sidelink packet duplication for transmission, a PDCP PDU is duplicated at the PDCP entity. The duplicated PDCP PDUs of the same PDCP entity are submitted to two different RLC entities and associated to two different sidelink logical channels respectively. The duplicated PDCP PDUs of the same PDCP entity are only allowed to be transmitted on different sidelink carriers. A UE can activate or deactivate sidelink packet duplication based on (pre)configuration. The PPPR value(s) for which sidelink packet duplication is supported can be (pre)configured via a PPPR threshold. For Mode 4 and Mode 3, the UE shall perform sidelink packet duplication for the data with the configured PPPR value(s) until packet duplication is de-configured for these PPPR value(s). For Mode 3, the UE reports the amount of data associated with one or more PPPR values, and the destination(s) to which the data belongs via sidelink BSR(s). A mapping of PPPR values to logical channel groups can be configured by the BS, and the PPPR value(s) are reflected by the associated logical channel group ID included in the sidelink BSR(s). A list of PPPR value(s) may be reported in Sidelink UE information by an RRC_CONNECTED UE.

For a UE using Mode 3, two non-overlapped sets of carriers are configured by the BS per destination reported by the UE to the network, and they apply to all the PPPR(s) that are configured for sidelink packet duplication. The UE then associates two duplicated sidelink logical channels corresponding to the same PDCP entity respectively with the two sets of carriers configured for the destination of the two sidelink logical channels. The association between the duplicated sidelink logical channel and the carrier set is up to UE implementation. Data of a duplicated sidelink logical channel can only be transmitted on the carrier(s) in the associated carrier set.

For V2X sidelink communication reception, packet duplication detection is performed at PDCP layer of the UE. Reordering function is also supported at PDCP layer and how to set the reordering timer at the PDCP layer is up to UE implementation. There are specific logical channel identities which apply to the sidelink logical channel used for sidelink packet duplication exclusively.

In some implementations, the techniques of logical channel prioritization (LCP) described below may be compliant with technical standard 3GPP TS 36.321 V15.2.0 (2018 July), e.g., Section 5.14.1.3.1.

The logical channel prioritization procedure is applied when a new transmission is performed. Each sidelink logical channel has an associated priority which is the PPPP and optionally an associated PPPR. Multiple sidelink logical channels may have the same associated priority. The mapping between priority and logical channel ID (LCID) is left for UE implementation. If duplication is activated, the MAC entity shall map different sidelink logical channels which correspond to the same PDCP entity in duplication onto different carriers or onto different carriers of different carrier set, if configured by upper layer, based on UE implementation.

The MAC entity shall perform the following Logical Channel Prioritization procedure either for each SCI transmitted in an SC period in sidelink communication, or for each SCI corresponding to a new transmission in V2X sidelink communication. The MAC entity shall allocate resources to the sidelink logical channels in the following steps.

Only consider sidelink logical channels not previously selected for this SC period and the SC periods (if any) which are overlapping with this SC period, to have data available for transmission in sidelink communication;

Only consider sidelink logical channels which are allowed on the carrier when the carrier is (re-)selected, where the SCI is transmitted for V2X sidelink communication, if configured by upper layers;

Exclude sidelink logical channel(s) not allowed on the carrier where the SCI is transmitted, if duplication is activated.

Step 0: Select a ProSe destination, having the sidelink logical channel with the highest priority, among the sidelink logical channels having data available for transmission and having the same transmission format as the one selected corresponding to the ProSe destination;

For each MAC PDU associated to the SCI:

Step 1: Among the sidelink logical channels belonging to the selected ProSe destination and having data available for transmission, allocate resources to the sidelink logical channel with the highest priority;

Step 2: if any resources remain, sidelink logical channels belonging to the selected ProSe destination are served in decreasing order of priority until either the data for the sidelink logical channel(s) or the SL grant is exhausted, whichever comes first. Sidelink logical channels configured with equal priority should be served equally.

The UE shall also follow the rules below during the scheduling procedures above.

The UE should not segment an RLC SDU (or partially transmitted SDU) if the whole SDU (or partially transmitted SDU) fits into the remaining resources;

if the UE segments an RLC SDU from the sidelink logical channel, it shall maximize the size of the segment to fill the grant as much as possible;

the UE should maximize the transmission of data;

if the MAC entity is given a sidelink grant size that is equal to or larger than 10 bytes (for sidelink communication) or 11 bytes (for V2X sidelink communication) while having data available for transmission, the MAC entity shall not transmit only padding.

In some implementations, the techniques of TX carrier (re-)selection for V2X sidelink communication described below may be compliant with technical standard 3GPP TS 36.321 V15.2.0 (2018 July), e.g., Section 5.14.1.5.

The MAC entity shall consider a CBR of a carrier to be one measured by lower layers if CBR measurement results are available, or the corresponding defaultTxConfigIndex configured by upper layers for the carrier if CBR measurement results are not available.

The MAC entity shall:

1> if the MAC entity is configured by upper layers to transmit using pool(s) of resources on one or multiple carriers and data is available in STCH (i.e. initial Tx carrier selection):

2> for each sidelink logical channel where data is available:

3> for each carrier configured by upper layers associated with the concerned sidelink logical channel:

4> if the CBR of the carrier is below threshCBR-FreqReselection associated with the priority of the sidelink logical channel:
    5> consider the carrier as a candidate carrier for TX carrier (re-)selection for the concerned sidelink logical channel.
1> else if the MAC entity has been configured by upper layers to transmit using pool(s) of resources on one or multiple carriers, and the TX carrier reselection is triggered for a process associated with a carrier (i.e. Tx carrier reselection):
  2> for each sidelink logical channel allowed on the carrier where data is available and Tx carrier (re-)selection is triggered:
    3> if the CBR of the carrier is below threshCBR-FreqKeeping associated with priority of sidelink logical channel:
      4> select the carrier and the associated pool of resources.
    3> else:
      4> for each carrier configured by upper layers, if the CBR of the carrier is below threshCBR-FreqReselection associated with the priority of the sidelink logical channel;
        5> consider the carrier as a candidate carrier for TX carrier (re-)selection.
The MAC entity shall:
1> if one or more carriers are considered as the candidate carriers for TX carrier (re-)selection:
  2> for each sidelink logical channel allowed on the carrier where data is available and Tx carrier (re-)selection is triggered, select one or more carrier(s) and associated pool(s) of resources among the candidate carriers with increasing order of CBR from the lowest CBR.

It is left to UE implementation how many carriers to select based on UE capability. It is left to UE implementation to determine the sidelink logical channels for which Tx carrier (re-) selection is triggered among the sidelink logical channels allowed on the carrier.

As described above, PDCP entity can activate and perform duplication of a data unit. Thus, PDCP entity can send the data unit to multiple RLC entities when duplication is activated. Each RLC entity corresponds to a single logical channel. Different logical channels corresponding to the same PDCP entity should use different carriers for sidelink transmissions.

Meanwhile, currently there is no clear UE operation when the UE deactivates and/or de-configure duplication. Even when the UE deactivates duplication, the UE does not immediately release the carrier where duplicated data units are transmitted. Since the UE may reserve resources on the carrier for duplication, if the UE deactivates duplication, it is desirable to release/leave the carrier. However, currently Tx carrier reselection procedure is not triggered by the deactivation of duplication, and therefore, the UE should maintain the selected carrier unnecessarily.

Figure 7:
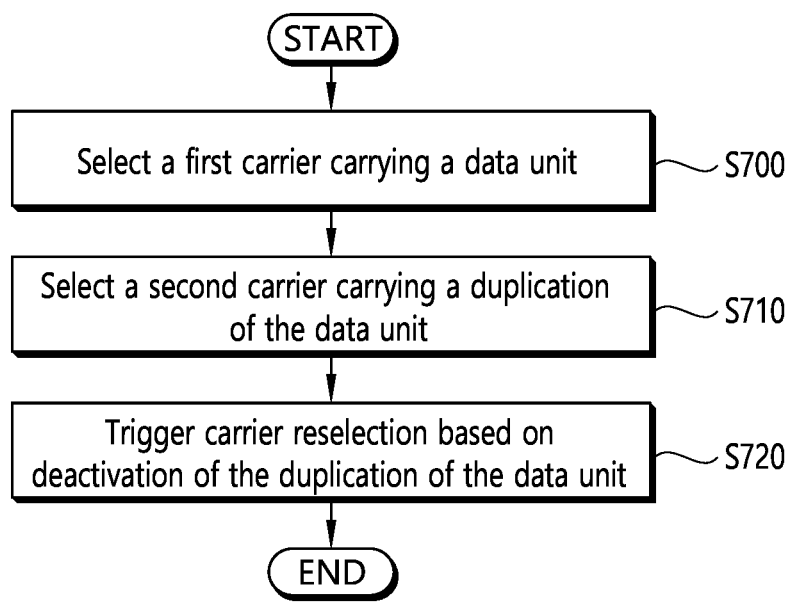
FIG. 7 shows an example of a method for triggering a Tx carrier reselection procedure for deactivated duplication according to an embodiment of the present invention.

FIG. 7 shows an example of a method for triggering a Tx carrier reselection procedure for deactivated duplication according to an embodiment of the present invention.

The embodiment of the present invention may be performed by a wireless device. The wireless device may include a UE, a vehicle, a vehicle equipped with an autonomous driving function, a connected car, a drone, a UAV, an AI module, a robot, an AR device, a VR device, an MR device, a hologram device, a public safety device, an MTC device, an IoT device, a medical device, a fin-tech device (or, a financial device), a security device, a climate/environmental device, a device related to 5G services, or a device related to the fourth industrial revolution. In the description below, a UE is described as an example of a wireless device.

For transmissions over more than one carrier, the UE receives configuration of more than one carrier including a first carrier and a second carrier.

In step S700, the UE selects a first carrier carrying a data unit. The UE may select one or more carriers among the carriers received in the configuration as the first carrier. The first carrier may be related to a first logical channel. The first carrier may be selected for the first logical channel.

In step S710, the UE selects a second carrier carrying a duplication of the data unit, when duplication of the data unit is activated for the L2 entity a second logical channel. The UE may select one or more carriers among the carriers received in the configuration as the second carrier. The second carrier may be related to the second logical channel. The first carrier may be selected for the second logical channel. The L2 entity may be a PDCP entity.

In step S720, the UE triggers a carrier reselection based on deactivation of the duplication of the data unit. In other words, when duplication of the data unit is deactivated for the L2 entity with the second logical channel, the UE triggers the carrier reselection procedure.

The carrier reselection may be triggered further based on availability of data mapped to the second carrier. The availability of data mapped to the second carrier may be based on whether the data is available in a L2 buffer or not. The L2 buffer may include a PDCP buffer, a RLC buffer, or a HARQ buffer.

For example, when the carrier(s) that has been selected for the second logical channel (i.e. the second carrier) are currently selected only for the second logical channel and data is not available for the second logical channel, the UE may trigger carrier reselection procedure for the carrier(s).

For example, when the carrier(s) that has been selected for the second logical channel (i.e. the second carrier) are currently selected for other logical channel(s) as well as the second logical channel, duplication is deactivated or not configured for the other logical channel(s), and data is not available for the other logical channel(s) and the second logical channel, the UE may trigger carrier reselection procedure for the carrier(s).

For example, when the carrier(s) that has been selected for the second logical channel (i.e. the second carrier) are currently selected only either for the second logical channel or for deactivated or released logical channel(s), the UE may trigger carrier reselection procedure for the carrier(s).

Based on triggering of the carrier reselection procedure, the UE may consider that the carrier(s) that has been selected for the second logical channel (i.e. the second carrier) are not selected.

According to the embodiment of the present invention shown in FIG. 7, when PDCP packet duplication is deactivated, the UE can release a carrier where duplicated PDCP PDU was transmitted. Therefore, unnecessary reserved resource can be released.

According to the embodiment of the present invention. SL grant reception and SCI transmission is performed as follows.

In order to transmit on the sidelink shared channel (SL-SCH), the MAC entity of the UE must have at least one sidelink grant.

Sidelink grants are selected as follows for sidelink communication:
1> if the MAC entity is configured to receive a single sidelink grant dynamically on the PDCCH and more data is available in STCH than can be transmitted in the current SC period, the MAC entity shall:

2> using the received sidelink grant determine the set of subframes in which transmission of SCI and transmission of first transport block occur;

2> consider the received sidelink grant to be a configured sidelink grant occurring in those subframes starting at the beginning of the first available SC Period which starts at least 4 subframes after the subframe in which the sidelink grant was received, overwriting a previously configured sidelink grant occurring in the same SC period, if available;

2> clear the configured sidelink grant at the end of the corresponding SC period;

1> else, if the MAC entity is configured by upper layers to receive multiple sidelink grants dynamically on the PDCCH and more data is available in STCH than can be transmitted in the current SC period, the MAC entity shall for each received sidelink grant:

2> using the received sidelink grant determine the set of subframes in which transmission of SCI and transmission of first transport block occur;

2> consider the received sidelink grant to be a configured sidelink grant occurring in those subframes starting at the beginning of the first available SC Period which starts at least 4 subframes after the subframe in which the sidelink grant was received, overwriting a previously configured sidelink grant received in the same subframe number but in a different radio frame as this configured sidelink grant occurring in the same SC period, if available;

2> clear the configured sidelink grant at the end of the corresponding SC period;

1> else, if the MAC entity is configured by upper layers to transmit using one or multiple pool(s) of resources and more data is available in STCH than can be transmitted in the current SC period, the MAC entity shall for each sidelink grant to be selected:

2> if configured by upper layers to use a single pool of resources:

3> select that pool of resources for use;

2> else, if configured by upper layers to use multiple pools of resources:

3> select a pool of resources for use from the pools of resources configured by upper layers whose associated priority list includes the priority of the highest priority of the sidelink logical channel in the MAC PDU to be transmitted;

2> randomly select the time and frequency resources for SL-SCH and SCI of a sidelink grant from the selected resource pool. The random function shall be such that each of the allowed selections can be chosen with equal probability;

2> use the selected sidelink grant to determine the set of subframes in which transmission of SCI and transmission of first transport block occur;

2> consider the selected sidelink grant to be a configured sidelink grant occurring in those subframes starting at the beginning of the first available SC period which starts at least 4 subframes after the subframe in which the sidelink grant was selected;

2> clear the configured sidelink grant at the end of the corresponding SC period;

Retransmissions on SL-SCH cannot occur after the configured sidelink grant has been cleared.

Sidelink grants are selected as follows for V2X sidelink communication:

1> if the MAC entity is configured to receive a sidelink grant dynamically on the PDCCH and data is available in STCH, the MAC entity shall:

2> use the received sidelink grant to determine the number of HARQ retransmissions and the set of subframes in which transmission of SCI and SL-SCH occur;

2> consider the received sidelink grant to be a configured sidelink grant;

1> if the MAC entity is configured by upper layers to receive a sidelink grant on the PDCCH addressed to SL semi-persistent scheduling (SPS) V2X RNTI (V-RNTI), the MAC entity shall for each SL SPS configuration:

2> if PDCCH contents indicate SPS activation:

3> use the received sidelink grant to determine the number of HARQ retransmissions and the set of subframes in which transmission of SCI and SL-SCH occur;

3> consider the received sidelink grant to be a configured sidelink grant;

2> if PDCCH contents indicate SPS release:

3> clear the corresponding configured sidelink grant;

1> if the MAC entity is configured by upper layers to transmit using pool(s) of resources in one or multiple carriers based on sensing, or partial sensing, or random selection only if upper layers indicates that transmissions of multiple MAC PDUs are allowed, and the MAC entity selects to create a configured sidelink grant corresponding to transmissions of multiple MAC PDUs, and data is available or duplication in the corresponding PDCP entity is deactivated in STCH associated with one or multiple carriers, the MAC entity shall for each sidelink process configured for multiple transmissions on a selected carrier:

2> if SL_RESOURCE_RESELECTION_COUNTER=0 and when SL_RESOURCE_RESELECTION_COUNTER was equal to 1 the MAC entity randomly selected, with equal probability, a value in the interval [0, 1] which is above the probability configured by upper layers in probResourceKeep; or 2> if neither transmission nor retransmission has been performed by the MAC entity on any resource indicated in the configured sidelink grant during the last second; or 2> if sl-ReselectAfter is configured and the number of consecutive unused transmission opportunities on resources indicated in the configured sidelink grant is equal to sl-ReselectAfter; or 2> if there is no configured sidelink grant; or 2> if the configured sidelink grant cannot accommodate a RLC SDU by using the maximum allowed MCS configured by upper layers in maxMCS-PSSCH and the MAC entity selects not to segment the RLC SDU; or 2> if transmission(s) with the configured sidelink grant cannot fulfil the latency requirement of the data in a sidelink logical channel according to the associated PPPP, and the MAC entity selects not to perform transmission(s) corresponding to a single MAC PDU; or 2> if a pool of resources is configured or reconfigured by upper layers for the selected carrier:

2> if duplication in the PDCP entity corresponding to the STCH is deactivated, data is not available in L2 buffers (i.e. PDCP buffer, RLC buffer and HARQ buffer) for sidelink logical channels associated with the carrier (or the resource pool):

3> clear the configured sidelink grant, if available;

3> trigger the TX carrier (re-)selection procedure as specified below;

2> if the carrier is (re-)selected in the Tx carrier (re-)selection, the following is performed on the selected carrier:

3> select one of the allowed values configured by upper layers in restrictResourceReservationPeriod and set the resource reservation interval by multiplying 100 with the selected value;

3> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

3> select the number of HARQ retransmissions from the allowed numbers that are configured by upper layers in allowedRetxNumberPSSCH included in pssch-TxConfig-List and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

3> select an amount of frequency resources within the range that is configured by upper layers between minSubchannel-NumberPSSCH and maxSubchannel-Number PSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

3> if transmission based on random selection is configured by upper layers:

4> randomly select the time and frequency resources for one transmission opportunity from the resource pool, according to the amount of selected frequency resources. The random function shall be such that each of the allowed selections can be chosen with equal probability;

3> else:

4> randomly select the time and frequency resources for one transmission opportunity from the resources indicated by the physical layer, according to the amount of selected frequency resources. The random function shall be such that each of the allowed selections can be chosen with equal probability;

3> use the randomly selected resource to select a set of periodic resources spaced by the resource reservation interval for transmission opportunities of SCI and SL-SCH corresponding to the number of transmission opportunities of MAC PDUs;

3> if the number of HARQ retransmissions is equal to 1 and there are available resources left in the resources indicated by the physical layer that meet the conditions for more transmission opportunities:

4> randomly select the time and frequency resources for one transmission opportunity from the available resources, according to the amount of selected frequency resources. The random function shall be such that each of the allowed selections can be chosen with equal probability;

4> use the randomly selected resource to select a set of periodic resources spaced by the resource reservation interval for the other transmission opportunities of SCI and SL-SCH corresponding to the number of retransmission opportunities of the MAC PDUs;

4> consider the first set of transmission opportunities as the new transmission opportunities and the other set of transmission opportunities as the retransmission opportunities;

4> consider the set of new transmission opportunities and retransmission opportunities as the selected sidelink grant.

3> else:

4> consider the set as the selected sidelink grant;

3> use the selected sidelink grant to determine the set of subframes in which transmissions of SCI and SL-SCH occur;

3> consider the selected sidelink grant to be a configured sidelink grant;

2> else if SL_RESOURCE_RESELECTION_COUNTER=0 and when SL_RESOURCE_RESELECTION_COUNTER was equal to 1 the MAC entity randomly selected, with equal probability, a value in the interval [0, 1] which is less than or equal to the probability configured by upper layers in probResourceKeep:

3> clear the configured sidelink grant, if available;

3> randomly select, with equal probability, an integer value in the interval [5, 15] for the resource reservation interval higher than or equal to 100 ms, in the interval [10, 30] for the resource reservation interval equal to 50 ms or in the interval [25, 75] for the resource reservation interval equal to 20 ms, and set SL_RESOURCE_RESELECTION_COUNTER to the selected value;

3> use the previously selected sidelink grant for the number of transmissions of the MAC PDUs with the resource reservation interval to determine the set of subframes in which transmissions of SCI and SL-SCH occur;

3> consider the selected sidelink grant to be a configured sidelink grant;

1> else, if the MAC entity is configured by upper layers to transmit using pool(s) of resources in one or multiple carriers, the MAC entity selects to create a configured sidelink grant corresponding to transmission(s) of a single MAC PDU, and data is available in STCH associated with one or multiple carriers, the MAC entity shall for a Sidelink process on a selected carrier:

2> trigger the TX carrier (re-)selection procedure as specified below;

2> if the carrier is (re-)selected in the Tx carrier (re-)selection, the following is performed on the selected carrier:

3> select the number of HARQ retransmissions from the allowed numbers that are configured by upper layers in allowedRetxNumberPSSCH included in pssch-TxConfig-List and, if configured by upper layers, overlapped in allowedRetxNumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

3> select an amount of frequency resources within the range that is configured by upper layers between minSubchannel-NumberPSSCH and maxSubchannel-NumberPSSCH included in pssch-TxConfigList and, if configured by upper layers, overlapped between minSubchannel-NumberPSSCH and maxSubchannel-NumberPSSCH indicated in cbr-pssch-TxConfigList for the highest priority of the sidelink logical channel(s) allowed on the selected carrier and the CBR measured by lower layers if CBR measurement results are available or the corresponding defaultTxConfigIndex configured by upper layers if CBR measurement results are not available;

3> if transmission based on random selection is configured by upper layers:

4> randomly select the time and frequency resources for one transmission opportunity of SCI and SL-SCH from the resource pool, according to the amount of selected frequency resources. The random function shall be such that each of the allowed selections can be chosen with equal probability;
   3> else:
      4> randomly select the time and frequency resources for one transmission opportunity of SCI and SL-SCH from the resources indicated by the physical layer, according to the amount of selected frequency resources. The random function shall be such that each of the allowed selections can be chosen with equal probability;
   3> if the number of HARQ retransmissions is equal to 1:
      4> if transmission based on random selection is configured by upper layers and there are available resources that meet the conditions for one more transmission opportunity:
         5> randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
      4> else, if transmission based on sensing or partial sensing is configured by upper layers and there are available resources left in the resources indicated by the physical layer that meet the conditions for one more transmission opportunity:
         5> randomly select the time and frequency resources for the other transmission opportunity of SCI and SL-SCH corresponding to additional transmission of the MAC PDU from the available resources, according to the amount of selected frequency resources. The random function shall be such that each of the allowed selections can be chosen with equal probability;
      4> consider a transmission opportunity which comes first in time as the new transmission opportunity and a transmission opportunity which comes later in time as the retransmission opportunity;
      4> consider both of the transmission opportunities as the selected sidelink grant;
   3> else:
      4> consider the transmission opportunity as the selected sidelink grant;
   3> use the selected sidelink grant to determine the subframes in which transmission(s) of SCI and SL-SCH occur;
   3> consider the selected sidelink grant to be a configured sidelink grant.

For V2X sidelink communication, the UE should ensure the randomly selected time and frequency resources fulfil the latency requirement.

The MAC entity shall for each subframe:
1> if the MAC entity has a configured sidelink grant occurring in this subframe:
   2> if SL_RESOURCE_RESELECTION_COUNTER=1 and the MAC entity randomly selected, with equal probability, a value in the interval [0, 1] which is above the probability configured by upper layers in probResource-Keep:
      3> set the resource reservation interval equal to 0;
   2> if the configured sidelink grant corresponds to transmission of SCI:
      3> instruct the physical layer to transmit SCI corresponding to the configured sidelink grant;
      3> for V2X sidelink communication, deliver the configured sidelink grant, the associated HARQ information and the value of the highest priority of the sidelink logical channel(s) in the MAC PDU to the Sidelink HARQ entity for this subframe;
   2> else if the configured sidelink grant corresponds to transmission of first transport block for sidelink communication:
      3> deliver the configured sidelink grant and the associated HARQ information to the Sidelink HARQ Entity for this subframe.

According to the embodiment of the present invention TX carrier (re-) selection for V2X sidelink communication is performed as follows.

The MAC entity shall consider a CBR of a carrier to be one measured by lower layers if CBR measurement results are available, or the corresponding defaultTxConfigIndex configured by upper layers for the carrier if CBR measurement results are not available.

The MAC entity shall consider that different sidelink logical channels which correspond to the same PDCP entity in duplication are not allowed on the same carrier.

If the TX carrier (re-)selection is triggered for a process associated with a carrier, the MAC entity of the UE shall:
1> if the MAC entity is configured or reconfigured by upper layers to transmit using pool(s) of resources on one or multiple carriers and data is available in STCH (i.e. initial Tx carrier selection): or
1> if the MAC entity has been configured by upper layers to transmit using pool(s) of resources on one or multiple carriers, and data is available in STCH only allowed on one or more carriers which are not currently selected:
   2> for each sidelink logical channel where data is available:
      3> for each carrier configured by upper layers allowed for the concerned sidelink logical channel:
         4> if the CBR of the carrier is below threshCBR-FreqReselection associated with the priority of the sidelink logical channel:
            5> consider the carrier as a candidate carrier for TX carrier (re-)selection for the concerned sidelink logical channel.
1> else if the MAC entity has been configured by upper layers to transmit using pool(s) of resources on one or multiple carriers (i.e. Tx carrier reselection):
   2> for each sidelink logical channel allowed on the carrier where data is available and Tx carrier (re-)selection is triggered:
      3> if the CBR of the carrier is below threshCBR-FreqKeeping associated with priority of sidelink logical channel:
         4> select the carrier and the associated pool of resources.
      3> else:
         4> for each carrier configured by upper layers, if the CBR of the carrier is below threshCBR-FreqReselection associated with the priority of the sidelink logical channel;
            5> consider the carrier as a candidate carrier for TX carrier (re-)selection.
   2> for each sidelink logical channel allowed on the carrier where data is not available (in all L2 buffers) and Tx carrier (re-)selection is triggered:
      3> if the carrier(s) that has been selected for the second logical channel are currently selected only for the second logical channel; or
      3> if the carrier(s) that has been selected for the second logical channel are currently selected for other logical channel(s) as well as the logical channel, duplication is deactivated or not configured for the other logical channel(s), and data is not available for the other logical channel(s) as well as the second logical channel:
         4> consider that the carrier is not selected for TX carrier (re-)selection.

The MAC entity shall:
1> if one or more carriers are considered as the candidate carriers for TX carrier (re-)selection:
2> for each sidelink logical channel allowed on the carrier where data is available and Tx carrier (re-)selection is triggered, select one or more carrier(s) and associated pool(s) of resources among the candidate carriers with increasing order of CBR from the lowest CBR.

Figure 8:
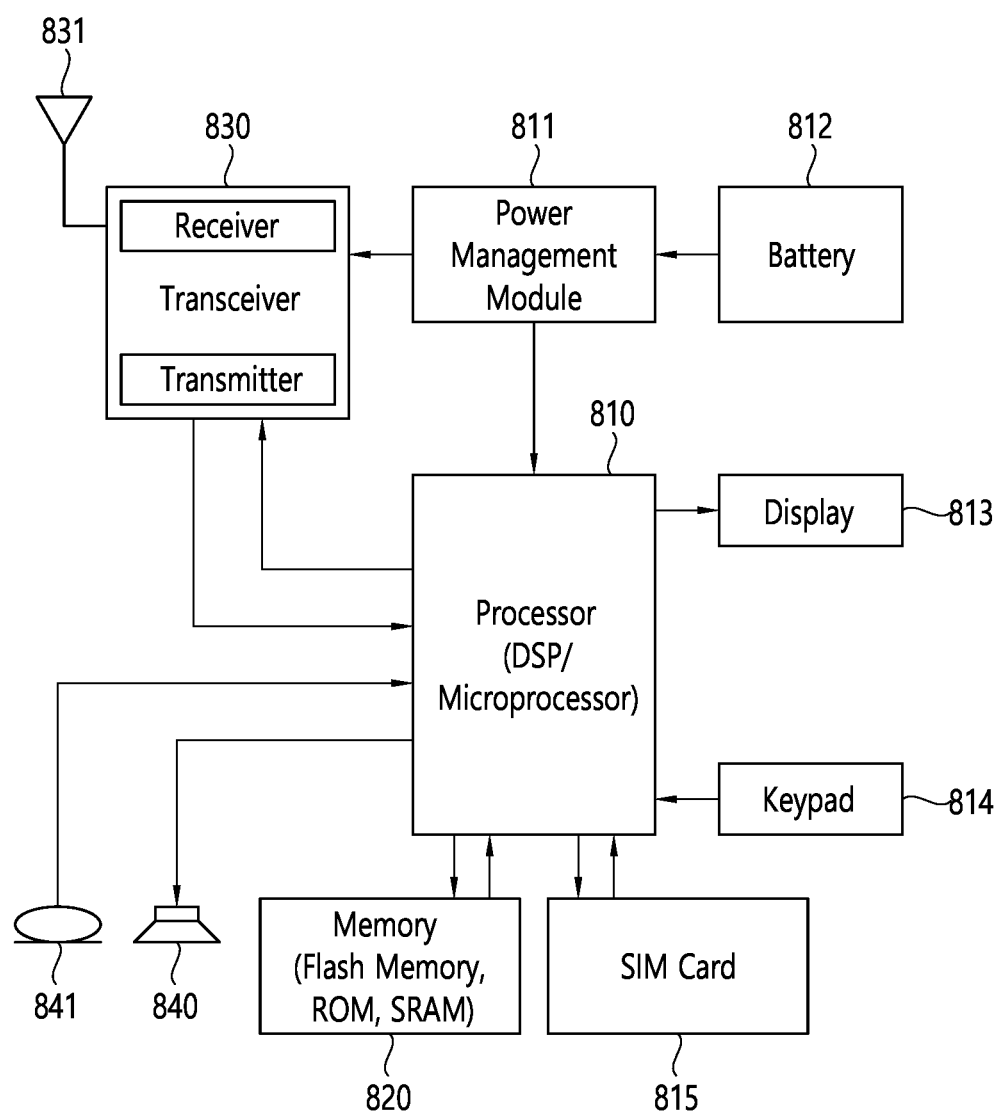
FIG. 8 shows a UE to which the technical features of the present invention can be applied.

FIG. 8 shows a UE to which the technical features of the present invention can be applied.

A UE includes a processor 810, a power management module 811, a battery 812, a display 813, a keypad 814, a subscriber identification module (SIM) card 815, a memory 820, a transceiver 830, one or more antennas 831, a speaker 840, and a microphone 841.

The processor 810 may be configured to implement proposed functions, procedures and/or methods described in this description. Layers of the radio interface protocol may be implemented in the processor 810. The processor 810 may include application-specific integrated circuit (ASIC), other chipset, logic circuit and/or data processing device. The processor 810 may be an application processor (AP). The processor 810 may include at least one of a digital signal processor (DSP), a central processing unit (CPU), a graphics processing unit (GPU), a modem (modulator and demodulator). An example of the processor 810 may be found in SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or a corresponding next generation processor.

The processor 810 is configured to select a first carrier carrying a data unit. The first carrier may be related to a first logical channel. The first carrier may be selected for the first logical channel.

The processor 810 is configured to select a second carrier carrying a duplication of the data unit, when duplication of the data unit is activated for the L2 entity a second logical channel. The second carrier may be related to the second logical channel. The first carrier may be selected for the second logical channel. The L2 entity may be a PDCP entity.

The processor 810 is configured to trigger a carrier reselection based on deactivation of the duplication of the data unit. In other words, when duplication of the data unit is deactivated for the L2 entity with the second logical channel, the carrier reselection procedure may be triggered.

The carrier reselection may be triggered further based on availability of data mapped to the second carrier. The availability of data mapped to the second carrier may be based on whether the data is available in a L2 buffer or not. The L2 buffer may include a PDCP buffer, a RLC buffer, or a HARQ buffer.

For example, when the carrier(s) that has been selected for the second logical channel (i.e. the second carrier) are currently selected only for the second logical channel and data is not available for the second logical channel, the carrier reselection procedure may be triggered.

For example, when the carrier(s) that has been selected for the second logical channel (i.e. the second carrier) are currently selected for other logical channel(s) as well as the second logical channel, duplication is deactivated or not configured for the other logical channel(s), and data is not available for the other logical channel(s) and the second logical channel, the carrier reselection procedure may be triggered.

For example, when the carrier(s) that has been selected for the second logical channel (i.e. the second carrier) are currently selected only either for the second logical channel or for deactivated or released logical channel(s), the carrier reselection procedure may be triggered.

Based on triggering of the carrier reselection procedure, the processor 810 may consider that the carrier(s) that has been selected for the second logical channel (i.e. the second carrier) are not selected.

The power management module 811 manages power for the processor 810 and/or the transceiver 830. The battery 812 supplies power to the power management module 811. The display 813 outputs results processed by the processor 810. The keypad 814 receives inputs to be used by the processor 810. The keypad 814 may be shown on the display 813. The SIM card 815 is an integrated circuit that is intended to securely store the international mobile subscriber identity (IMSI) number and its related key, which are used to identify and authenticate subscribers on mobile telephony devices (such as mobile phones and computers). It is also possible to store contact information on many SIM cards.

The memory 820 is operatively coupled with the processor 810 and stores a variety of information to operate the processor 810. The memory 820 may include read-only memory (ROM), random access memory (RAM), flash memory, memory card, storage medium and/or other storage device. When the embodiments are implemented in software, the techniques described herein can be implemented with modules (e.g., procedures, functions, and so on) that perform the functions described herein. The modules can be stored in the memory 820 and executed by the processor 810. The memory 820 can be implemented within the processor 810 or external to the processor 810 in which case those can be communicatively coupled to the processor 810 via various means as is known in the art.

The transceiver 830 is operatively coupled with the processor 810, and transmits and/or receives a radio signal. The transceiver 830 includes a transmitter and a receiver. The transceiver 830 may include baseband circuitry to process radio frequency signals. The transceiver 830 controls the one or more antennas 831 to transmit and/or receive a radio signal.

The speaker 840 outputs sound-related results processed by the processor 810. The microphone 841 receives sound-related inputs to be used by the processor 810.

According to the embodiment of the present invention shown in FIG. 8, when PDCP packet duplication is deactivated, the UE can release a carrier where duplicated PDCP PDU was transmitted. Therefore, unnecessary reserved resource can be released.

The present invention may be applied to various future technologies, such as AI.

<AI>

AI refers to artificial intelligence and/or the field of studying methodology for making it. Machine learning is a field of studying methodologies that define and solve various problems dealt with in AI. Machine learning may be defined as an algorithm that enhances the performance of a task through a steady experience with any task.

An artificial neural network (ANN) is a model used in machine learning. It can mean a whole model of problem-solving ability, consisting of artificial neurons (nodes) that form a network of synapses. An ANN can be defined by a connection pattern between neurons in different layers, a learning process for updating model parameters, and/or an activation function for generating an output value. An ANN may include an input layer, an output layer, and optionally one or more hidden layers. Each layer may contain one or more neurons, and an ANN may include a synapse that links neurons to neurons. In an ANN, each neuron can output a summation of the activation function for input signals, weights, and deflections input through the synapse. Model parameters are parameters determined through learning, including deflection of neurons and/or weights of synaptic connections. The hyper-parameter means a parameter to be set in the machine learning algorithm before learning, and includes a learning rate, a repetition number, a mini batch size, an initialization function, etc. The objective of the ANN learning can be seen as determining the model parameters that minimize the loss function. The loss function can be used as an index to determine optimal model parameters in learning process of ANN.

Machine learning can be divided into supervised learning, unsupervised learning, and reinforcement learning, depending on the learning method. Supervised learning is a method of learning ANN with labels given to learning data. Labels are the answers (or result values) that ANN must infer when learning data is input to ANN. Unsupervised learning can mean a method of learning ANN without labels given to learning data. Reinforcement learning can mean a learning method in which an agent defined in an environment learns to select a behavior and/or sequence of actions that maximizes cumulative compensation in each state.

Machine learning, which is implemented as a deep neural network (DNN) that includes multiple hidden layers among ANN, is also called deep learning. Deep learning is part of machine learning. In the following, machine learning is used to mean deep learning.

Figure 9:
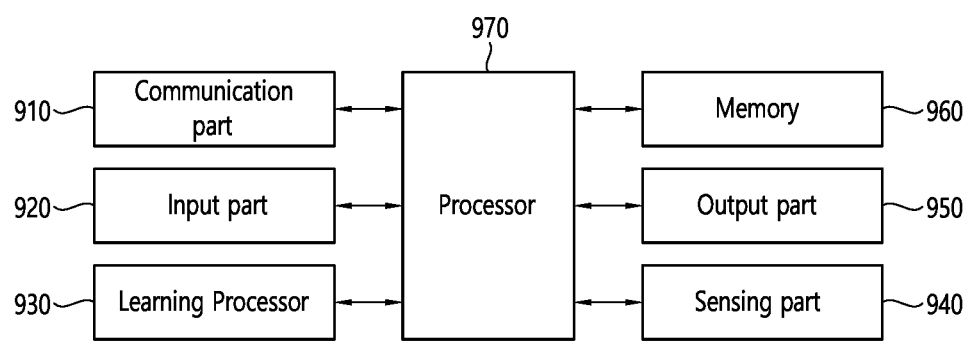
FIG. 9 shows an example of an AI device to which the technical features of the present invention can be applied.

FIG. 9 shows an example of an AI device to which the technical features of the present invention can be applied.

The AI device 900 may be implemented as a stationary device or a mobile device, such as a TV, a projector, a mobile phone, a smartphone, a desktop computer, a notebook, a digital broadcasting terminal, a PDA, a PMP, a navigation device, a tablet PC, a wearable device, a set-top box (STB), a digital multimedia broadcasting (DMB) receiver, a radio, a washing machine, a refrigerator, a digital signage, a robot, a vehicle, etc.

Referring to FIG. 9, the AI device 900 may include a communication part 910, an input part 920, a learning processor 930, a sensing part 940, an output part 950, a memory 960, and a processor 970.

The communication part 910 can transmit and/or receive data to and/or from external devices such as the AI devices and the AI server using wire and/or wireless communication technology. For example, the communication part 910 can transmit and/or receive sensor information, a user input, a learning model, and a control signal with external devices. The communication technology used by the communication part 910 may include a global system for mobile communication (GSM), a code division multiple access (CDMA), an LTE/LTE-A, a 5G, a WLAN, a Wi-Fi, Bluetooth™, radio frequency identification (RFID), infrared data association (IrDA), ZigBee, and/or near field communication (NFC).

The input part 920 can acquire various kinds of data. The input part 920 may include a camera for inputting a video signal, a microphone for receiving an audio signal, and a user input part for receiving information from a user. A camera and/or a microphone may be treated as a sensor, and a signal obtained from a camera and/or a microphone may be referred to as sensing data and/or sensor information. The input part 920 can acquire input data to be used when acquiring an output using learning data and a learning model for model learning. The input part 920 may obtain raw input data, in which case the processor 970 or the learning processor 930 may extract input features by preprocessing the input data.

The learning processor 930 may learn a model composed of an ANN using learning data. The learned ANN can be referred to as a learning model. The learning model can be used to infer result values for new input data rather than learning data, and the inferred values can be used as a basis for determining which actions to perform. The learning processor 930 may perform AI processing together with the learning processor of the AI server. The learning processor 930 may include a memory integrated and/or implemented in the AI device 900. Alternatively, the learning processor 930 may be implemented using the memory 960, an external memory directly coupled to the AI device 900, and/or a memory maintained in an external device.

The sensing part 940 may acquire at least one of internal information of the AI device 900, environment information of the AI device 900, and/or the user information using various sensors. The sensors included in the sensing part 940 may include a proximity sensor, an illuminance sensor, an acceleration sensor, a magnetic sensor, a gyro sensor, an inertial sensor, an RGB sensor, an IR sensor, a fingerprint recognition sensor, an ultrasonic sensor, an optical sensor, a microphone, a light detection and ranging (LIDAR), and/or a radar.

The output part 950 may generate an output related to visual, auditory, tactile, etc. The output part 950 may include a display unit for outputting visual information, a speaker for outputting auditory information, and/or a haptic module for outputting tactile information.

The memory 960 may store data that supports various functions of the AI device 900. For example, the memory 960 may store input data acquired by the input part 920, learning data, a learning model, a learning history, etc.

The processor 970 may determine at least one executable operation of the AI device 900 based on information determined and/or generated using a data analysis algorithm and/or a machine learning algorithm. The processor 970 may then control the components of the AI device 900 to perform the determined operation. The processor 970 may request, retrieve, receive, and/or utilize data in the learning processor 930 and/or the memory 960, and may control the components of the AI device 900 to execute the predicted operation and/or the operation determined to be desirable among the at least one executable operation. The processor 970 may generate a control signal for controlling the external device, and may transmit the generated control signal to the external device, when the external device needs to be linked to perform the determined operation. The processor 970 may obtain the intention information for the user input and determine the user's requirements based on the obtained intention information. The processor 970 may use at least one of a speech-to-text (STT) engine for converting speech input into a text string and/or a natural language processing (NLP) engine for acquiring intention information of a natural language, to obtain the intention information corresponding to the user input. At least one of the STT engine and/or the NLP engine may be configured as an ANN, at least a part of which is learned according to a machine learning algorithm. At least one of the STT engine and/or the NLP engine may be learned by the learning processor 930 and/or learned by the learning processor of the AI server, and/or learned by their distributed processing. The processor 970 may collect history information including the operation contents of the AI device 900 and/or the user's feedback on the operation, etc. The processor 970 may store the collected history information in the memory 960 and/or the learning processor 930, and/or transmit to an external device such as the AI server. The collected history information can be used to update the learning model. The processor 970 may control at least some of the components of AI device 900 to drive an application program stored in memory 960. Furthermore, the processor 970 may operate two or more of the components included in the AI device 900 in combination with each other for driving the application program.

Figure 10:
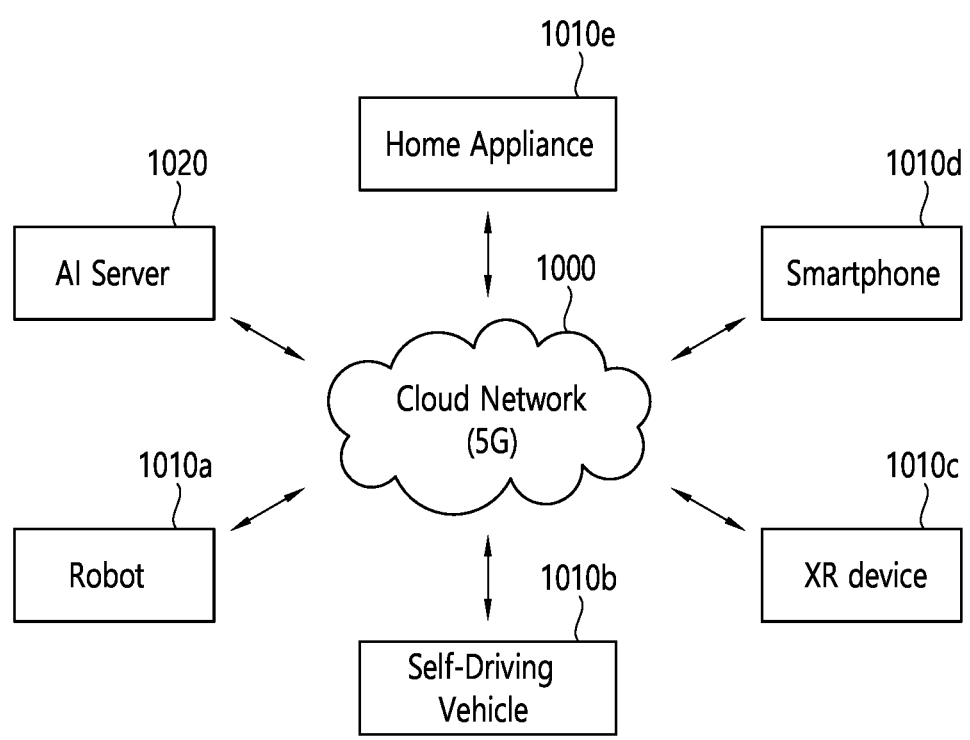
FIG. 10 shows an example of an AI system to which the technical features of the present invention can be applied.

FIG. 10 shows an example of an AI system to which the technical features of the present invention can be applied.

Referring to FIG. 10, in the AI system, at least one of an AI server 1020, a robot 1010a, an autonomous vehicle 1010b, an XR device 1010c, a smartphone 1010d and/or a home appliance 1010e is connected to a cloud network 1000. The robot 1010a, the autonomous vehicle 1010b, the XR device 1010c, the smartphone 1010d, and/or the home appliance 1010e to which the AI technology is applied may be referred to as AI devices 1010a to 1010e.

The cloud network 1000 may refer to a network that forms part of a cloud computing infrastructure and/or resides in a cloud computing infrastructure. The cloud network 1000 may be configured using a 3G network, a 4G or LTE network, and/or a 5G network. That is, each of the devices 1010a to 1010e and 1020 consisting the AI system may be connected to each other through the cloud network 1000. In particular, each of the devices 1010a to 1010e and 1020 may communicate with each other through a base station, but may directly communicate with each other without using a base station.

The AI server 1000 may include a server for performing AI processing and a server for performing operations on big data. The AI server 1000 is connected to at least one or more of AI devices constituting the AI system, i.e. the robot 1010a, the autonomous vehicle 1010b, the XR device 1010c, the smartphone 1010d and/or the home appliance 1010e through the cloud network 1000, and may assist at least some AI processing of the connected AI devices 1010a to 1010e. The AI server 1000 can learn the ANN according to the machine learning algorithm on behalf of the AI devices 1010a to 1010e, and can directly store the learning models and/or transmit them to the AI devices 1010a to 1010e. The AI server 1000 may receive the input data from the AI devices 1010a to 1010e, infer the result value with respect to the received input data using the learning model, generate a response and/or a control command based on the inferred result value, and transmit the generated data to the AI devices 1010a to 1010e. Alternatively, the AI devices 1010a to 1010e may directly infer a result value for the input data using a learning model, and generate a response and/or a control command based on the inferred result value.

Various embodiments of the AI devices 1010a to 1010e to which the technical features of the present invention can be applied will be described. The AI devices 1010a to 1010e shown in FIG. 10 can be seen as specific embodiments of the AI device 900 shown in FIG. 9.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

Claims in the present description can be combined in a various way. For instance, technical features in method claims of the present description can be combined to be implemented or performed in an apparatus, and technical features in apparatus claims can be combined to be implemented or performed in a method. Further, technical features in method claim(s) and apparatus claim(s) can be combined to be implemented or performed in an apparatus. Further, technical features in method claim(s) and apparatus claim(s) can be combined to be implemented or performed in a method.

What is claimed is:

1. A method performed by a wireless device configured to operate in a wireless communication system, the method comprising:
   receiving a configuration of one or more carriers from a network;
   activating and performing, at a packet data convergence protocol (PDCP) entity of the wireless device, a duplication of a data unit based on sending the data unit to both a first radio link control (RLC) entity and a second RLC entity,
   wherein the first RLC entity is associated with a first logical channel, and
   wherein the second RLC entity is associated with a second logical channel;
   selecting a first carrier, from the one or more carriers, related to the first logical channel;
   based on the duplication of the data unit, selecting a second carrier, from the one or more carriers, related to the second logical channel which is different from the first logical channel;
   performing a sidelink transmission of the data unit with the duplication on both the first carrier and the second carrier; and
   upon deactivation of the duplication of the data unit at the PDCP entity, triggering a carrier reselection based on i) the second carrier being selected only for the second logical channel and ii) data being not available for the second logical channel.

2. The method of claim 1, wherein triggering the carrier reselection comprises not selecting the second carrier.

3. The method of claim 1, wherein the data being not available for the second logical channel is based on whether the data is available in a layer-2 (L2) buffer or not.

4. The method of claim 3, wherein the L2 buffer includes a packet data convergence protocol (PDCP) buffer, a radio link control (RLC) buffer, or a hybrid automatic repeat request (HARD) buffer.

5. The method of claim 1, wherein the carrier reselection is triggered when the second carrier is selected for other logical channels as well as the second logical channel and data is not available for the other logical channels and the second logical channel.

6. The method of claim 1, wherein the carrier reselection is triggered when the second carrier is selected only either for the second logical channel or for deactivated or release logical channel.

7. The method of claim 1, wherein the wireless device is in communication with at least one of a user equipment, a network, and/or autonomous vehicles other than the wireless device.

8. A wireless device configured to operate in a wireless communication system, the wireless device comprising:
   a memory;
   a transceiver; and
   a processor, operably coupled to the memory and the transceiver, and configured to perform operations comprising:
   receiving a configuration of one or more carriers from a network;
   activating and performing, at a packet data convergence protocol (PDCP) entity of the wireless device, a duplication of a data unit based on sending the data unit to both a first radio link control (RLC) entity and a second RLC entity,
   wherein the first RLC entity is associated with a first logical channel, and
   wherein the second RLC entity is associated with a second logical channel;
   selecting a first carrier, from the one or more carriers, related to the first logical channel;
   based on the duplication of the data unit, selecting a second carrier, from the one or more carriers, related to the second logical channel which is different from the first logical channel;
   performing a sidelink transmission of the data unit with the duplication on both the first carrier and the second carrier; and
   upon deactivation of the duplication of the data unit at the PDCP entity, triggering a carrier reselection based on i) the second carrier being selected only for the second logical channel and ii) data being not available for the second logical channel.

* * * * *